United States Patent
Sullivan

(10) Patent No.: US 9,899,886 B2
(45) Date of Patent: Feb. 20, 2018

(54) DEVICES AND METHODS FOR MAGNETIC FLUX RETURN OPTIMIZATION IN ELECTROMAGNETIC MACHINES

(71) Applicant: Boulder Wind Power, Inc., Louisville, CO (US)

(72) Inventor: Brian J. Sullivan, Boulder, CO (US)

(73) Assignee: Boulder Wind Power, Inc., Louisville, CO (US)

( * ) Notice: Subject to any disclaimer, the term of this patent is extended or adjusted under 35 U.S.C. 154(b) by 859 days.

(21) Appl. No.: 14/264,246

(22) Filed: Apr. 29, 2014

(65) Prior Publication Data

US 2015/0311756 A1    Oct. 29, 2015

(51) Int. Cl.
*H02K 41/02* (2006.01)
*H02K 1/27* (2006.01)

(52) U.S. Cl.
CPC ............ *H02K 1/2793* (2013.01); *H02K 1/27* (2013.01); *H02K 1/278* (2013.01); *H02K 1/2786* (2013.01)

(58) Field of Classification Search
CPC .... H02K 41/02; H02K 1/2793; H02K 1/2786; H02K 1/278; H02K 1/27
USPC ........................................................ 310/268
See application file for complete search history.

(56) References Cited

U.S. PATENT DOCUMENTS

| | | |
|---|---|---|
| 3,768,054 A | 10/1973 | Neugebauer |
| 4,168,439 A | 9/1979 | Palma |
| 4,318,019 A | 3/1982 | Teasley et al. |
| 4,549,155 A | 10/1985 | Halbach |
| 4,628,809 A | 12/1986 | Das et al. |
| 4,701,737 A | 10/1987 | Leupold |
| 4,906,060 A | 3/1990 | Claude |

(Continued)

FOREIGN PATENT DOCUMENTS

| EP | 1263116 | 12/2002 |
|---|---|---|
| EP | 1732011 A1 | 12/2006 |

(Continued)

OTHER PUBLICATIONS

Yolacan, E. et al., "Magnet shape optimization of a slotted surface-mounted axial gap PM motor for reducing cogging torque," XIX International Conference on Electrical Machines—ICEM 2010, Rome, 2010, ISBN 978-1-4244-4175-4, 6 pages.

(Continued)

*Primary Examiner* — Naishadh Desai
(74) *Attorney, Agent, or Firm* — Cooley LLP

(57) ABSTRACT

A rotor element configured for movement relative to a stator includes a backing member formed, at least in part, from a ferromagnetic material; a first magnetic pole having a first polarity; and a second magnetic pole having a second polarity, opposite the first polarity. The first magnetic pole and the second magnetic pole are coupled to a first surface of the backing member such that the second magnetic pole is disposed, relative to the first magnetic pole, at a distance defined in a direction of a width of the backing member. A thickness of the backing member is varied along the width of the backing member to form a plurality of alternating first portions and second portions. The first portions include protrusions extending from a second surface of the backing member, opposite the first surface, such that the first portions are thicker than the second portions.

24 Claims, 18 Drawing Sheets

(56) References Cited

U.S. PATENT DOCUMENTS

| | | |
|---|---|---|
| 5,172,310 A | 12/1992 | Deam et al. |
| 5,289,042 A | 2/1994 | Lis |
| 5,300,910 A | 4/1994 | Unkelbach et al. |
| 5,406,196 A | 4/1995 | Sameshima |
| 5,418,446 A | 5/1995 | Hallidy |
| 5,525,894 A | 6/1996 | Heller |
| 5,587,643 A | 12/1996 | Heller |
| 5,619,085 A | 4/1997 | Shramo |
| 5,652,485 A | 7/1997 | Spiegel et al. |
| 5,710,476 A | 1/1998 | Ampela |
| 5,783,894 A | 7/1998 | Wither |
| 5,798,632 A | 8/1998 | Muljadi |
| 5,844,324 A | 12/1998 | Spriggle |
| 5,844,341 A | 12/1998 | Spooner et al. |
| 6,064,123 A | 5/2000 | Gislason |
| 6,066,945 A | 5/2000 | Shimazu et al. |
| 6,104,108 A | 8/2000 | Hazelton et al. |
| 6,127,739 A | 10/2000 | Appa |
| 6,157,147 A | 12/2000 | Lin |
| 6,163,097 A | 12/2000 | Smith et al. |
| 6,163,137 A | 12/2000 | Wallace et al. |
| 6,249,058 B1 | 6/2001 | Rea |
| 6,310,387 B1 | 10/2001 | Seefeldt et al. |
| 6,326,713 B1 | 12/2001 | Judson |
| 6,373,161 B1 | 4/2002 | Khalaf |
| 6,392,371 B1 | 5/2002 | Cheng et al. |
| 6,426,580 B1 | 7/2002 | Ikeda et al. |
| 6,476,513 B1 | 11/2002 | Gueorguiev |
| 6,476,534 B1 | 11/2002 | Venderbeck et al. |
| 6,476,535 B1 | 11/2002 | Oohashi et al. |
| 6,522,045 B2 | 2/2003 | Ikeda et al. |
| 6,522,046 B2 | 2/2003 | Ideda et al. |
| 6,541,877 B2 | 4/2003 | Kim et al. |
| 6,583,532 B2 | 6/2003 | Hein et al. |
| 6,598,573 B2 | 7/2003 | Kobayashi |
| 6,652,712 B2 | 11/2003 | Wang et al. |
| 6,664,704 B2 | 12/2003 | Calley |
| 6,756,719 B1 | 6/2004 | Chiu |
| 6,784,634 B2 | 8/2004 | Sweo |
| 6,794,777 B1 | 9/2004 | Fradella |
| 6,794,781 B2 | 9/2004 | Razzell et al. |
| 6,836,028 B2 | 12/2004 | Northrup et al. |
| 6,836,036 B2 | 12/2004 | Dubé |
| 6,841,892 B1 | 1/2005 | Le Nabour et al. |
| 6,844,656 B1 | 1/2005 | Larsen et al. |
| 6,849,965 B2 | 2/2005 | Le Nabour et al. |
| 6,856,039 B2 | 2/2005 | Mikhail et al. |
| 6,891,302 B1 | 5/2005 | Gabrys |
| 6,894,413 B2 | 5/2005 | Nakano et al. |
| 6,943,461 B2 | 9/2005 | Kaploun |
| 6,943,478 B2 | 9/2005 | Zepp et al. |
| 7,034,427 B2 | 4/2006 | Hirzel |
| 7,042,109 B2 | 5/2006 | Gabrys |
| 7,042,128 B2 | 5/2006 | Zepp et al. |
| 7,045,702 B2 | 5/2006 | Kashyap |
| 7,057,384 B2 | 6/2006 | Wobben |
| 7,061,133 B1 | 6/2006 | Leijon et al. |
| 7,064,455 B2 | 6/2006 | Lando |
| 7,068,015 B1 | 6/2006 | Feddersen |
| 7,081,696 B2 | 7/2006 | Ritchey |
| 7,088,029 B2 | 8/2006 | Hiramatsu |
| 7,105,975 B2 | 9/2006 | Semones et al. |
| 7,109,625 B1 | 9/2006 | Jore et al. |
| 7,135,952 B2 | 11/2006 | Harding |
| 7,154,192 B2 | 12/2006 | Jansen et al. |
| 7,154,193 B2 | 12/2006 | Jansen et al. |
| 7,170,212 B2 | 1/2007 | Balson et al. |
| 7,187,098 B2 * | 3/2007 | Hasebe ............... H02K 1/2793 310/156.43 |
| 7,190,101 B2 | 3/2007 | Hirzel |
| 7,193,409 B2 | 3/2007 | Wobben |
| 7,218,012 B1 | 5/2007 | Edenfeld |
| 7,230,361 B2 | 6/2007 | Hirzel |
| 7,245,037 B2 | 7/2007 | Ängquist et al. |
| 7,245,042 B1 | 7/2007 | Simnacher |
| 7,253,543 B2 | 8/2007 | Akiyama |
| 7,303,369 B2 | 12/2007 | Rowan et al. |
| 7,315,101 B2 | 1/2008 | Shimada |
| 7,332,837 B2 | 2/2008 | Ward et al. |
| 7,385,330 B2 | 6/2008 | Trzynadlowski et al. |
| 7,443,066 B2 | 10/2008 | Salamah et al. |
| 7,471,181 B1 | 12/2008 | MacLennan |
| 7,492,074 B1 | 2/2009 | Rittenhouse |
| 7,548,008 B2 | 6/2009 | Jansen et al. |
| 7,557,482 B2 | 7/2009 | Aydin et al. |
| 7,579,742 B1 | 8/2009 | Rittenhouse |
| 7,612,463 B2 | 11/2009 | Cullen et al. |
| 7,640,648 B1 | 1/2010 | Rittenhouse |
| 7,646,126 B2 | 1/2010 | Trzynadlowski et al. |
| 7,656,135 B2 | 2/2010 | Schram et al. |
| 7,679,249 B2 | 3/2010 | Appa et al. |
| 7,692,357 B2 | 4/2010 | Qu et al. |
| 7,710,081 B2 | 5/2010 | Saban et al. |
| 7,710,234 B2 | 5/2010 | Gardner et al. |
| 7,723,891 B2 | 5/2010 | Rittenhouse |
| 7,772,741 B1 | 8/2010 | Rittenhouse |
| 7,781,932 B2 | 8/2010 | Jansen |
| 7,830,057 B2 | 11/2010 | Gieras |
| 7,839,049 B2 | 11/2010 | Jansen et al. |
| 7,851,965 B2 | 12/2010 | Calley et al. |
| 7,868,508 B2 | 1/2011 | Calley et al. |
| 7,868,510 B2 | 1/2011 | Rittenhouse |
| 7,888,839 B2 | 2/2011 | Gabrys et al. |
| 7,923,886 B2 | 4/2011 | Calley et al. |
| 8,040,011 B2 | 10/2011 | Mueller et al. |
| 8,115,348 B2 | 2/2012 | Hsu et al. |
| 8,178,992 B1 | 5/2012 | Meller |
| 8,397,369 B2 | 3/2013 | Smith et al. |
| 8,400,038 B2 | 3/2013 | Smith et al. |
| 8,716,913 B2 | 5/2014 | Kvam et al. |
| 8,823,241 B2 | 9/2014 | Jore et al. |
| 9,154,024 B2 | 10/2015 | Jore et al. |
| 2002/0180294 A1 | 12/2002 | Kaneda et al. |
| 2004/0046471 A1 | 3/2004 | Kim et al. |
| 2007/0108850 A1 | 5/2007 | Chertok |
| 2007/0284960 A1 | 12/2007 | Fulton et al. |
| 2007/0290569 A1 | 12/2007 | Bode et al. |
| 2009/0097003 A1 | 4/2009 | Cox et al. |
| 2010/0052437 A1 | 3/2010 | Froeschle et al. |
| 2010/0181858 A1 | 7/2010 | Hibbs et al. |
| 2011/0012440 A1 | 1/2011 | Toyota et al. |
| 2011/0133596 A1* | 6/2011 | Asano ............... H02K 1/2793 310/268 |
| 2012/0200177 A1 | 8/2012 | Atkinson et al. |
| 2012/0251213 A1 | 10/2012 | Iesaki |
| 2012/0262019 A1 | 10/2012 | Smith et al. |
| 2012/0262020 A1 | 10/2012 | Smith et al. |
| 2013/0214631 A1 | 8/2013 | Smith et al. |

FOREIGN PATENT DOCUMENTS

| | | |
|---|---|---|
| JP | H04-244766 | 9/1992 |
| JP | H07-39090 | 2/1995 |
| JP | H07-97529 | 10/1995 |
| JP | 36-79673 | 8/2005 |
| WO | WO 2010/036747 | 4/2010 |
| WO | WO 2010/083054 | 7/2010 |

OTHER PUBLICATIONS

Merritt, B. et al., "Halbach Array Motor/Generators—A Novel Generalized Electric Machine," Lawrence Livermore National Laboratory, Oct. 28, 1994, UCRL-JC-119050; 8 pages.

Zheng, P. et al., "Optimization of the Magnetic Pole Shape of a Permanent-Magnet Synchronous Motor," IEEE Transactions on Magnetics, vol. 43, No. 6, Jun. 2007, 3 pages.

Mohammed, O. et al., "Effect of change in pole shape design on harmonic contents of PM synchronous motor air gap flux density waveform," 2007, ISBN 1-4244-1029-0, 5 pages.

Dubois, M., "Optimized Permanent Magnet Generator Topologies for Direct-Drive Wind Turbines," Thesis, Jan. 26, 2004, ISBN 0-9734585-0-X, 264 pages.

(56) References Cited

OTHER PUBLICATIONS

Garcia, J. et al., "Transverse Flux Machines: What for?," IEEE Multidisciplinary Engineering Education Magazine, vol. 2, No. 1, Mar. 2007, 3 pages.

* cited by examiner

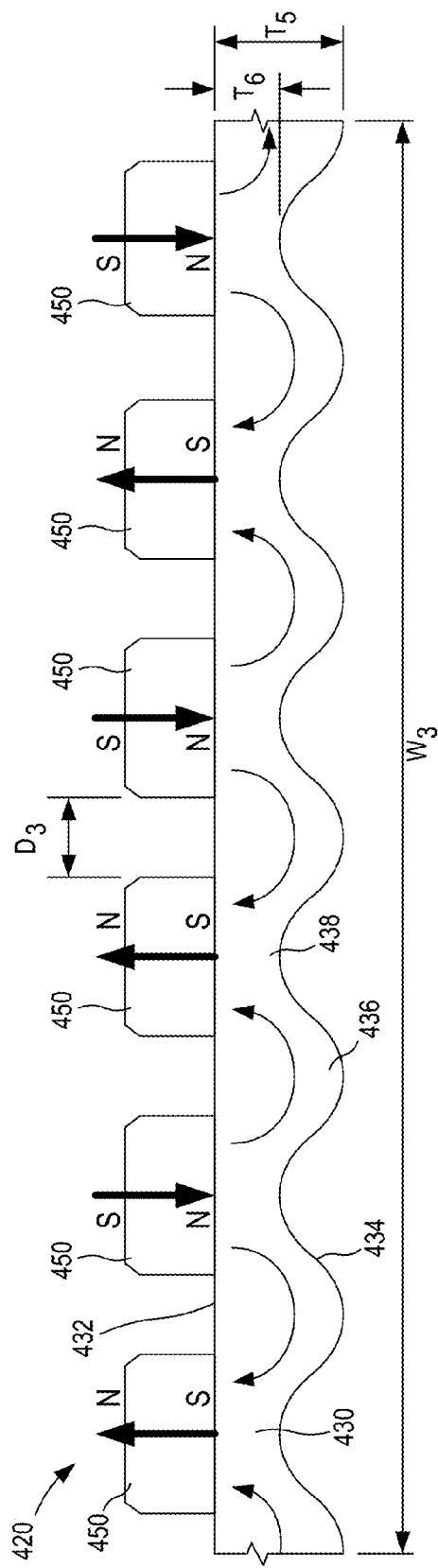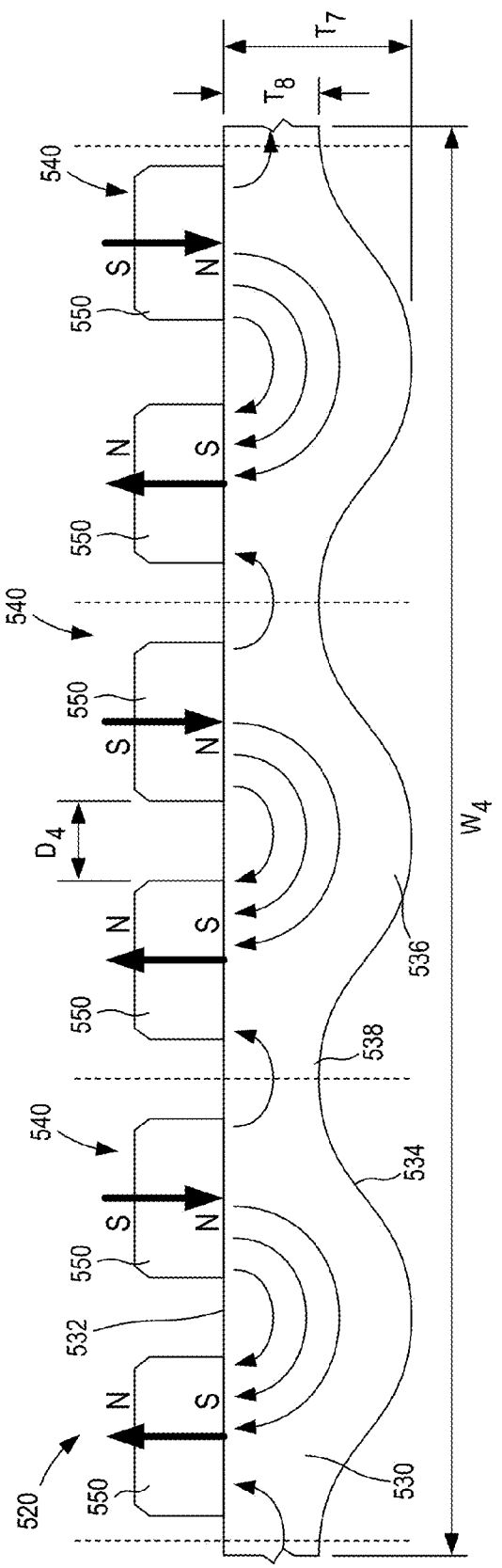

DEVICES AND METHODS FOR MAGNETIC FLUX RETURN OPTIMIZATION IN ELECTROMAGNETIC MACHINES

BACKGROUND

The embodiments described herein relate generally to electromagnetic machines and more particularly to devices and methods for optimizing magnetic flux return in electromagnetic machines.

In general, electromagnetic machines such as axial flux machines, radial flux machines, conical gap machines, transverse flux machines, and/or the like utilize magnetic flux from one or more magnetic poles (e.g., permanent magnets, electromagnets, induction windings, and/or the like) to convert mechanical energy to electrical energy or vice versa. Such machines typically include windings to carry electric current through coils that interact with the magnetic flux from the magnetic poles via a relative movement therebetween. In some instances, the magnetic poles can be mounted on a movable structure (e.g., on a rotor or otherwise moving part) and the windings can be mounted on a stationary structure (e.g., on a stator or the like) or vice versa. When operated as an electric motor, for example, current can be applied to the windings of a stator, which results in a movement of the magnetic poles (and therefore a rotor to which the magnetic poles are coupled) relative to the windings, thus converting electrical energy into mechanical energy. Conversely, when operated as a generator, an external force can be applied to a rotor of the generator, which results in a movement of the magnetic poles coupled thereto relative to the windings. Thus, a resulting voltage generated by the movement of the rotor relative to the stator can cause current to flow through the windings, thereby converting mechanical energy into electrical energy.

Surface mounted permanent magnet machines are a class of electromagnetic machines in which permanent magnets are mounted on a ferromagnetic structure or backing, commonly referred to as a back iron. Surface mounted permanent magnet machines are often relatively light weight and efficient, yet can be associated with limitations resulting from, inter alia, undesirable constraints regarding the flux return path between adjacent magnetic poles disposed on a backiron. For example, in some instances in which it is desirable to minimize weight of the electromagnetic machine, the size of the back iron (e.g., thickness, width, and/or length) is restricted, which can lead to magnetic flux saturation of at least portions of the back iron. Conversely, when the weight of the electromagnetic machine is not as limited and in an effort to mitigate the effects of saturation, the size of the back iron can be increased, which can increase the cost of the electromagnetic machine due to, for example, increase in material usage. Moreover, in some instances, the scale of the electromagnetic machine can be such that a single, continuous back iron is unrealistic (e.g., in electromagnetic machines used in large scale commercial applications such as, for example, utility grid-level power generation). As a result, the back iron of some such electromagnetic machines can be segmented, which can further lead to undesirable effects associated with magnetic flux density.

Thus, a need exists for improved devices and methods for optimizing magnetic flux return in electromagnetic machines such as, for example, a permanent magnet machine.

SUMMARY

Devices and methods for magnetic flux return optimization are described herein. In some embodiments, an apparatus includes a rotor element that is configured to be disposed for movement relative to a stator. The rotor element includes a backing member having a first surface and a second surface opposite the first surface, a first magnetic pole having a first polarity, and a second magnetic pole having a second polarity opposite the first polarity. The backing member is formed, at least in part, from a ferromagnetic material and has a length, a width, and a thickness. The first magnetic pole and the second magnetic pole are coupled to the first surface of the backing member such that the second magnetic pole is disposed, relative to the first magnetic pole, at a distance defined in a direction of the width of the backing member. The thickness of the backing member is varied along the width of the backing member such that the backing member includes a plurality of alternating first portions and second portions. The first portions include protrusions that extend from the second surface such that the first portions are thicker than the second portions.

BRIEF DESCRIPTION OF THE DRAWINGS

FIGS. 5-7 are schematic illustrations of machine elements for an electromagnetic machine each according to a different embodiment.

DETAILED DESCRIPTION

Figure 1:
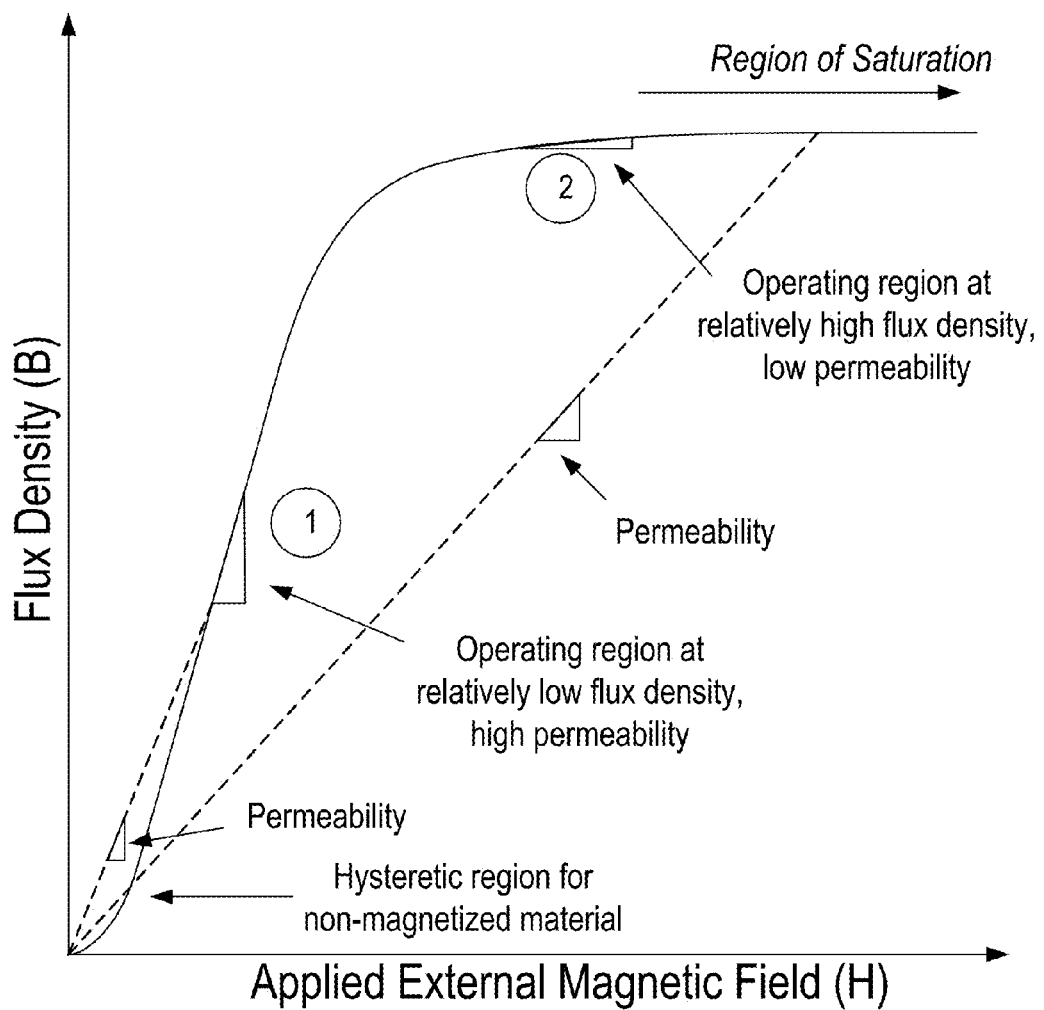
FIG. 1 is a graph illustrating a relationship between magnetic flux density and an applied external magnetic field.

Devices and methods for magnetic flux return optimization are described herein. For example, it may be desirable to optimize the structure of a back iron of an electromagnetic machine to maximize the useful flux that travels across, for example, the air gap between a first rotor element on a first side of a stator and a second rotor element on an opposite and a stator of the electromagnetic machine. In other embodiments, it may be desirable to optimize the structure of a back iron of an electromagnetic machine to maximize the useful flux that travels across, for example, the air gap between a rotor element and a stator element. Thus, electromagnetic machine structures are described herein that provide a back iron(s) with varying material dimensions to encourage a more uniform flux density between magnetic poles and/or to equalize the magnetic permeability of the back iron. The back irons (also referred to herein as "backing members") described herein can have a thickness (e.g., in an axial direction in an axial flux machine, or in a radial direction in a radial flux machine) that varies along a width of the back iron, a length (e.g., in an radial direction in an axial flux machine, or in an axial direction in a radial flux machine) that varies along the width of the back iron, or both. Thus, the back iron can have portions that are loaded with and/or otherwise carry magnetic flux to different levels depending on where the portions are located relative to the magnetic poles of the electromagnetic machine.

In some embodiments, an apparatus includes a rotor element that is configured to be disposed for movement relative to a stator. The rotor element includes a backing member having a first surface and a second surface opposite the first surface, a first magnetic pole having a first polarity, and a second magnetic pole having a second polarity opposite the first polarity. The backing member is formed, at least in part, from a ferromagnetic material and has a length, a width, and a thickness. The first magnetic pole and the second magnetic pole are coupled to the first surface of the backing member such that the second magnetic pole is disposed, relative to the first magnetic pole, at a distance defined in a direction of the width of the backing member. The thickness of the backing member is varied along the width of the backing member such that the backing member includes a plurality of alternating first portions and second portions. The first portions include protrusions that extend from the second surface such that the first portions are thicker than the second portions.

In some embodiments, an apparatus includes a rotor element that is configured to be disposed for movement relative to a stator. The rotor element includes a backing member, a first magnetic pole, and a second magnetic pole. The backing member is formed, at least in part, from a ferromagnetic material and has a length, a width, and a thickness. The first magnetic pole has a first polarity. The second magnetic pole has a second polarity opposite the first polarity. The first magnetic pole and the second magnetic pole are coupled to the backing member such that the second magnetic pole is disposed, relative to the first magnetic pole, at a distance defined in a direction of the width of the backing member. The length of the backing member is varied along the width of the backing member.

In some embodiments, a rotor element is configured to be disposed for movement relative to a stator. The rotor element includes a backing member formed at least in part of a ferromagnetic material. The backing member is coupled to a first magnetic pole, a second magnetic pole, a third magnetic pole, and a fourth magnetic pole. The first magnetic pole and the third magnetic pole have a first polarity. The second magnetic pole and the fourth magnetic pole have a second polarity opposite the first polarity. The backing member has a length, a width, and a thickness, and has an end portion in the width direction. The second magnetic pole is disposed at a distance in the width direction from the first magnetic pole on an opposite side of the first magnetic pole than the end portion of the backing member. The third magnetic pole is disposed at a distance in the width direction from the second magnetic pole on an opposite side of the second magnetic pole than the first magnetic pole. The fourth magnetic pole is disposed at a distance in the width direction from the third magnetic pole on an opposite side of the third magnetic pole than the second magnetic pole. The backing member has a first portion with a first thickness at a location between the third magnetic pole and the fourth magnetic pole, and a second portion having a second thickness at a location between the first magnetic pole and the second magnetic pole. The second thickness is greater than the first thickness.

In some embodiments, a rotor element is configured to be disposed for movement relative to a stator. The rotor element includes a backing member formed at least in part of a ferromagnetic material. The backing member is coupled to a first magnetic pole, a second magnetic pole, a third magnetic pole, and a fourth magnetic pole. The first magnetic pole and the third magnetic pole have a first polarity. The second magnetic pole and the fourth magnetic pole have a second polarity opposite the first polarity. The backing member has a length, a width, and a thickness, and has an end portion in the width direction. The second magnetic pole is disposed at a distance in the width direction from the first magnetic pole on an opposite side of the first magnetic pole than the end portion of the backing member. The third magnetic pole is disposed at a distance in the width direction from the second magnetic pole on an opposite side of the second magnetic pole than the first magnetic pole. The fourth magnetic pole is disposed at a distance in the width direction from the third magnetic pole on an opposite side of the third magnetic pole than the second magnetic pole. The backing member has a first portion with a first length at a location between the third magnetic pole and the fourth magnetic pole, and a second portion with a second length at a location between the first magnetic pole and the second magnetic pole. The second length is greater than the first length.

The embodiments and methods described here can be used in various types of electromagnetic machines. By way of example, the embodiments and methods described herein can be used in permanent magnet machines such as, axial flux machines, radial flux machines, conical gap machines, and/or transverse flux machines, in which a first component rotates about an axis or translates along an axis (e.g., in a single direction or in two directions) relative to a second component. Such machines typically include windings (e.g., disposed about an iron core, etched on a printed circuit board, and/or the like) to carry electric current through coils that interact with a magnetic flux from the magnets. For example, in some embodiments, the windings can be conductive traces chemically etched on one or more layers of a printed circuit board (PCB) and/or printed circuit board assembly (PCBA). In some applications (including the embodiments described herein), the permanent magnets are mounted on the first component (i.e., a rotor), configured to rotate about or translate along the axis and the windings are mounted on the second component (i.e., a stator), maintained in a substantially fixed or stationary position. In some instances, the embodiments described herein can be used in relatively large electromagnetic machines and/or components thereof such as, for example, those found in wind power generators. In other instances, the embodiments described herein can be used in other types of electromagnetic machines and mechanisms such as, for example, other types of generators and/or motors.

As used in this specification, the singular forms "a," "an" and "the" include plural referents unless the context clearly dictates otherwise. Thus, for example, the term "a member" is intended to mean a single member or a combination of members, "a material" is intended to mean one or more materials, or a combination thereof.

As used herein, the term "set" can refer to multiple features or a singular feature with multiple parts. For example, when referring to a set of protrusions, the set of protrusions can be considered as one protrusion with multiple portions, or the set of protrusions can be considered as multiple, distinct protrusions. Thus, a monolithically constructed component can include a set of protrusions. Such a set of protrusions may include multiple portions that are either continuous or discontinuous from each other. A set of protrusions can also be fabricated from multiple components that are produced separately and are later joined together (e.g., via a weld, an adhesive, or any suitable method).

As used herein, the terms "perpendicular" and "orthogonal" generally describe a relationship between two geometric constructions (e.g., two lines, two planes, a line and a plane, or the like) in which the two geometric constructions are disposed at substantially 90°. For example, a line is said to be perpendicular to another line when the lines intersect at an angle substantially equal to 90°. Similarly, when a planar surface (e.g., a two dimensional surface) is said to be orthogonal to another planar surface, the planar surfaces are disposed at substantially 90° as the planar surfaces extend to infinity. In a similar manner, the term "parallel," as used herein, generally describes a relationship between two geometric constructions (e.g., two lines, two planes, a line and a plane or the like) in which the two geometric constructions are substantially non-intersecting as they extend substantially to infinity. For example, when a planar surface is said to be parallel to a line, every point along the line is spaced apart from the nearest portion of the planar surface by a substantially equal distance.

The term "substantially" when used in connection with, for example, "perpendicular," "orthogonal," "parallel," and/or other geometric relationships is intended to convey that the structure so defined is nominally perpendicular, orthogonal, parallel, or the like. Thus, two geometric constructions described herein as being "substantially perpendicular" is intended to convey that, although a perpendicular arrangement is desirable, some non-perpendicularity can occur in a "substantially perpendicular" arrangement. Such non-perpendicularity can result from manufacturing tolerances, measurement tolerances, and/or other practical considerations (such as, for example, the pressure or force applied to a structure so described). Thus, a geometric construction modified by the term "substantially" includes such geometric properties within a tolerance of plus or minus less than 1%, 2%, 3%, 4%, 5%, 6%, 7%, 8%, 9%, 10%, or more of the stated geometric construction. Furthermore, although a geometric construction modified by the term "substantially" can allow for and/or otherwise encompass a tolerance of the stated geometric construction, it is not intended to exclude the exact geometric construction stated.

As used herein, the terms "length," "width," and "thickness" refer to dimensions of an object relative to a portion of an electromagnetic machine in which the object is disposed. Thus, in an electromagnetic machine having a rotor that is configured to rotate relative to a stator such as, for example, an axial flux machine, a component of the rotor can be said to have a length that is in a radial direction of the rotor, a width that is in a circumferential or tangential direction of the rotor, and a thickness that is in an axial direction of the rotor. In, for example, a radial flux machine in which a rotor rotates relative to a stator, a component of the rotor can be said to have a length that is in an axial direction of the rotor, a width that is in a circumferential or tangential direction of the rotor, and a thickness that is in a radial direction of the rotor. In, for example, a linear machine in which a rotor translates along an axis relative to a stator, a component of the rotor can be said to have a length that is orthogonal to the axis along which the rotor translates and that is parallel to a surface of the rotor on which one or more magnets are mounted, a width that is in an axial direction of the rotor, and a thickness that is orthogonal to the axis along which the rotor translates and that is orthogonal to the surface of the rotor on which the one or more magnets are mounted.

As used herein, the term "magnetic flux" relates generally to a passing of at least a portion of a magnetic B-field passing through a surface. More specifically, magnetic flux is a surface integral of the normal component of the magnetic B-field passing through that surface and is mathematically expressed in equation 1 below:

$$\Phi_B = \iint_S B \cdot dS \qquad \text{Equation 1}$$

where S is a generic surface and B is a magnetic flux density (also referred to as "magnetic B-field" or simply "magnetic field" according to the Amperian loop model).

When considering electromagnetic machines, a changing and/or moving magnetic flux associated with a set of magnetic poles can interact with a set of conductors, thereby producing a difference in voltage potential along the conductors in a process known as "electromagnetic induction," mathematically expressed in equation 2 below:

$$\nabla \times E = -\frac{dB}{dt} \qquad \text{Equation 2}$$

where $\nabla \times$ is a curl operator, E(r, t) is an electric field (as a function of position and time), and B(r, t) is a magnetic flux density (as a function of position and time).

Thus, as can be determined via equation 1 and equation 2 above, a difference in voltage potential along the conductors (which in turn, results in a current passing along the conductors) can be increased, for example, by increasing a density of the magnetic flux. Such an increase in the difference in voltage potential along the conductors can be desirable in, for example, electromagnetic machines especially those used for power generation or the like. One method for increasing the magnetic flux density can include selectively reducing magnetic reluctance of one or more components. As used herein, the terms "magnetic reluctance" or simply "reluctance" is related to an object's resistance to a magnetic field (analogous to electrical resistance), and is generally understood to be inversely proportional to the "magnetic permeability" or simply "permeability" of the material from which the object is formed or includes, and the object's cross sectional area configured to carry magnetic flux and is mathematically expressed in equation 3 below:

$$R = \frac{l}{\mu A} \qquad \text{Equation 3}$$

where R is reluctance, l is a length of a magnetic circuit, μ is the permeability of the constituent material, and A is the cross-sectional area.

For example, in an electromagnetic machine, for instance, the object's reluctance can be related to the cross-sectional area between adjacent magnetic poles. Therefore, an object's permeability and cross-sectional area are related to the ability of the object to support the formation of magnetic flux therein, also referred to as a capacity to convey magnetic flux. Moreover, the permeability of a material is generally associated with a relationship between a level of magnetic flux density, or B-field, and an applied magnetic H-field at a given operating point, as illustrated by the curve in FIG. 1, which is often referred to as a B-H curve or BH curve for a particular material. Incremental permeability, on the other hand, represents an incremental change in flux density or B-field through a material from an incremental change in an applied magnetic H-field, equivalent to the slope of the BH curve at a given operating point. Furthermore, in some magnetic designs it may be useful to consider "relative permeability" which is equal to the material's permeability divided by the permeability of free space (e.g., $\mu_o=4\pi\times10^7$ H·m$^{-1}$). This property is generally applied as a linear approximation, which is valid within a tolerance over some operating range, with materials that are commonly applied in machine design, for example, having relative permeability in an indicative range of 100 to 1,000,000 prior to reaching magnetic saturation.

Reluctance is an extensive property of the object being described, and is dependent upon the material from which the object is formed and certain physical characteristics of the object (e.g., cross-sectional shape, length, boundary conditions, etc.), as well as the strength of the magnetic field applied thereto. For example, the reluctance of an object can be increased or decreased by selectively including in the object a material having a desired "spontaneous magnetization." Spontaneous magnetization is an intensive property of the constituent material (i.e., is intrinsic to the constituent material) and describes a tendency for an object's subatomic particles (i.e., electrons) to have a substantially ordered spin state (necessary to be magnetized) in the absence of an external magnetic field and below a critical temperature known as the "Curie Temperature." Thus, the reluctance of an object can be decreased by introducing into the object and/or constructing the object of a material having a relatively large spontaneous magnetization. In some instances, however, a cost associated with such materials can make their use impractical.

The reluctance of the magnetic circuit of an object can also be increased or decreased by changing a physical characteristic of the object, such as the shape or cross-sectional area of the object. For example, a first object having a length, a cross-sectional area, and an applied magnetic H-field may have a smaller magnetic reluctance than a second object having an identical length and applied magnetic H-field but a smaller cross-sectional area, because the second object is carrying flux nearer to the magnetic saturation of the material. As used herein, the terms "magnetic saturation" or simply "saturation" generally refers to a state of an object when an increase in an applied external magnetic field results in a relatively small increase in magnetization of the object with little to no effect on practical uses (see e.g., FIG. 1). In some applications a property referred to as "saturation flux density" is used to describe the maximum flux density that a particular material can carry, though in most instances this is not a well-defined or precise number, and instead may be closer to an asymptotic limit where relative permeability becomes relatively small, wherein an incremental permeability of a B-H curve approaches the permeability of free space, or relative permeability approaches 1. As used herein, the term "saturation flux density" can refer to either a specific known value, or a generally understood practical limit for magnetic flux density through a particular material in an embodiment. Thus, as described herein with reference to the specific embodiments below, a reduction in an object's magnetic reluctance as a result of changes in size, shape, cross-sectional area, and/or constituent material can increase the magnetic flux density the object can carry and/or support for a particular applied magnetic field, and such changes can permit an object to carry such magnetic flux prior to reaching magnetic saturation and/or saturation flux density. When considering, for example, an object of an electromagnetic machine such as a rotor or a stator of a generator, an increase in the magnetic flux density carried and/or supported by that object can result in an increase of a voltage potential along a set of conductors, which in turn, can result in an increase of electrical power output of the electromagnetic machine.

Figure 2:
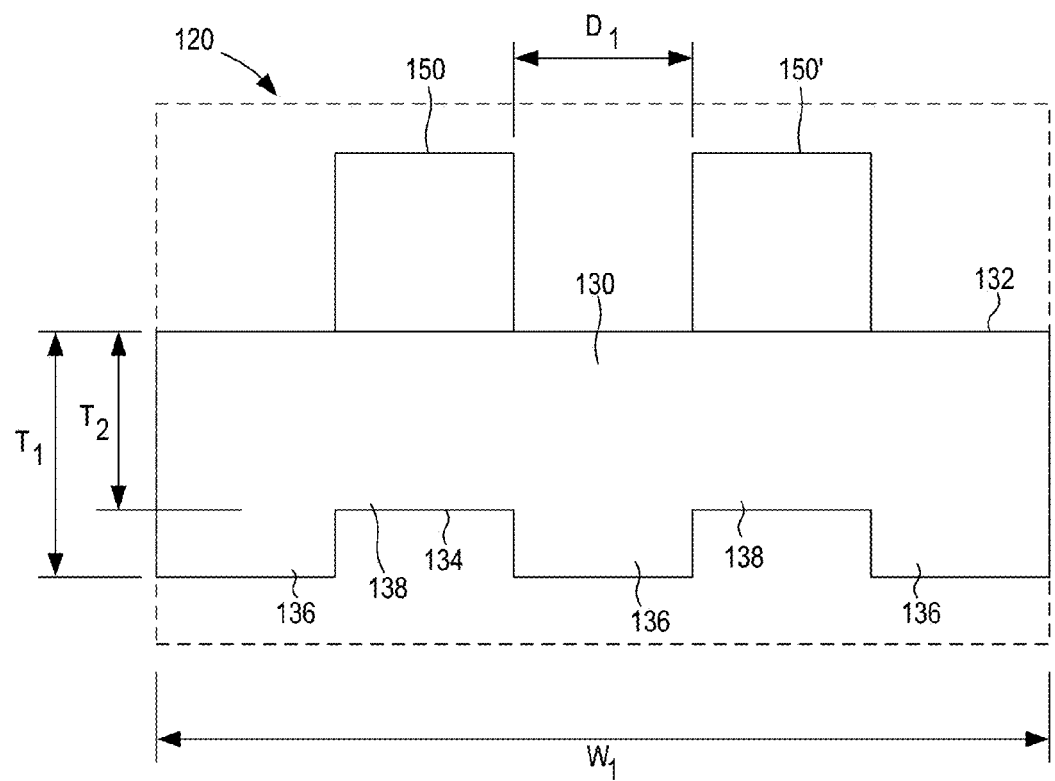
FIG. 2 is a schematic illustration of a machine element for an electromagnetic machine according to an embodiment.

FIG. 2 is a schematic illustration of a machine element 120 that can be included in, for example, an electromagnetic machine, according to an embodiment. The machine element 120 (also referred to herein as "element") can be disposed in a machine such as, for example, an axial flux machine, radial flux machine, conical gap machine, transverse flux machine, or translational linear electromagnetic machine. The machine element 120 can be, for example, a structure implemented within a generator or a motor. More specifically, the machine element 120 can be, for example, a rotor element that can be moved relative to a stator assembly (not shown). In some embodiments, the machine element 120 can rotate relative to the stator assembly (e.g., rotates with the direction of flux from rotor to stator generally in the axial or radial direction) or can move linearly relative to the stator assembly. Although not shown in FIG. 2, a stator assembly can include and/or can support, for example, an air core type stator without any ferromagnetic material to support a set of copper windings or conduct magnetic flux. In some embodiments, an air core stator can include an annular array of stator segments that each include one or more conductive windings or one or more magnets such as, for example, those described in U.S. patent application Ser. No. 13/144,642 entitled, "Segmented Stator for an Axial Field Device," filed Jan. 15, 2010 (referred to henceforth as the "'642 application") and/or those described in U.S. Pat. No. 7,109,625 entitled, "Conductor Optimized Axial Field Rotary Energy Device," filed Feb. 5, 2004 (referred to henceforth as the "'625 patent"), the disclosures of which are incorporated herein by reference in their entireties. In some embodiments, the stator segments can be, for example, printed circuit board sub-assemblies or the like. In other embodiments, a stator assembly can include or support a conventional iron-core construction arranged similarly to the air core concept described above.

The machine element 120 can include a backing member 130 that can be coupled to and/or support one or more magnetic pole assemblies. The backing member 130 has a first surface 132 and a second surface 134 and is configured to carry, support, and/or direct a magnetic flux (e.g., a magnetic flux return) between, for example, a pair of adjacent magnetic poles. As described in further detail herein, the backing member 130 can be any suitable shape, size, and/or configuration that can, for example, reduce a reluctance of the backing member 130. Furthermore, the arrangement of the backing member 130 can be such that a magnetic flux carried, supported, and/or directed by or through the backing member 130 can be increased prior to the backing member 130 approaching magnetic saturation, as described in further detail herein.

As shown in FIG. 2, a first magnetic pole 150 and a second magnetic pole 150' can be coupled to and/or otherwise disposed adjacent to the first surface 132 of the backing member 130. More particularly, the first magnetic pole 150 and the second magnetic pole 150' can be disposed along a width $W_1$ of the backing member 130 such that a distance $D_1$ is disposed therebetween. The magnetic poles 150 and 150' can be any suitable configuration. For example, in some embodiments, the magnetic poles 150 and 150' can each include an array of magnets such as, permanent magnets, electromagnets, or a combination thereof. For example, in an induction machine or wound field synchronous machine, the magnets are electromagnets. In some embodiments, the magnetic poles 150 and 150' can be configured as a flux focusing magnetic pole assembly substantially similar in form and/or function to those described in U.S. Pat. No. 8,397,369 entitled, "Flux Focusing Arrangement for Permanent Magnets, Methods of Fabricating Such Arrangements, and Machines Including Such Arrangements," and/or U.S. Pat. No. 8,400,038 entitled, "Flux Focusing Arrangement for Permanent Magnets, Methods of Fabricating Such Arrangements, and Machines Including Such Arrangements," the disclosures of which are incorporated herein by reference in their entireties (referred to henceforth as the "'369 patent" and the "'038 patent", respectively). Moreover, in some embodiments, the magnetic poles 150 and 150' can be substantially similar to and/or the same as those described in U.S. patent application Ser. No. 13/692,083 entitled, "Devices and Methods for Magnet Pole Retention in Permanent Magnet Machines," filed Dec. 3, 2012, the disclosure of which is incorporated herein by reference in its entirety (referred to henceforth as the "'083 application"). In some embodiments, the magnetic poles 150 and 150' can be arranged as any suitable combination of the embodiments described in the '369 patent, the '038 patent, and/or the '083 application.

In some embodiments, the magnetic poles 150 and 150' can be coupled directly to the first surface 132 of the backing member 130. In other embodiments, the magnetic poles 150 and 150' can be coupled to the backing member 130 via an intervening structure. For example, in some embodiments, the magnetic poles 150 and 150' can each be included in a different magnetic assembly or the like that can include a ferromagnetic structure or member that is coupled to the magnetic pole 150 or 150' and, for example, removably coupled to the backing member 130. In some embodiments, such a ferromagnetic structure or member can be permanently magnetized (e.g., by the magnetic pole 150 or 150' coupled thereto or magnetized independently from the magnetic poles 150 or 150'). In some embodiments, the magnetic poles 150 and/or 150' can be included in a magnetic assembly and/or subassembly such as, for example, those described in U.S. patent application Ser. No. 13/568,791 entitled, "Devices and Methods for Magnetic Pole and Back Iron Retention in Electromagnetic Machines," filed Aug. 7, 2012 (referred to henceforth as the "'791 application"), the disclosure of which is incorporated herein by reference in its entirety. As such, the magnetic poles 150 and 150' can be coupled to and/or disposed adjacent to the first surface 132 of the backing member 130 such that magnetic flux can flow from, the first magnetic pole 150, through the backing member 130, to the second magnetic pole 150' (or vice versa), as described in further detail herein.

The backing member 130 can be any suitable structure. The backing member 130 can be, for example, a back iron segment or the like formed from a ferromagnetic material. More particularly, in some embodiments, the backing member 130 can be a back iron segment similar in form and/or function to those described in, for example, U.S. patent application Ser. No. 13/152,164 entitled, "Systems and Methods for Improved Direct Drive Generators," filed Jun. 2, 2011 (referred to henceforth as the "'164 application"), the disclosure of which is incorporated herein by reference in its entirety. As such, the machine element 120 can be, for example, a segment included in a segmented rotor of a permanent magnetic machine (i.e., a generator and/or a motor).

As described above, the backing member 130 can carry, support, and/or direct magnetic flux between the magnetic poles 150 and 150'. In some embodiments, the backing member 130 can be selectively arranged to reduce, for example, the reluctance of one or more portions of the backing member 130 and thus, such portions can carry, support, and/or direct a greater amount of magnetic flux than one or more portions of the backing member 130 without a reduced reluctance. For example, as shown in FIG. 2, the second surface of the backing member 130 can include a set of alternating first portions 136 and second portions 138. The first portions 136 can include and/or can otherwise form a set of protrusions that extend from the second surface 134 of the backing member 130. As such, the backing member 130 can have a first thickness $T_1$ associated with the first portions 136 (i.e., a thickness between the first surface 132 and the second surface 134 at a point along one of the first portions 136), and a second thickness $T_2$ associated with the second portions 138 (i.e., a thickness between the first surface 132 and the second surface 134 at a point along one of the second portions 138). In this manner, the first thickness $T_1$ is greater than the second thickness $T_2$, as shown in FIG. 2. Moreover, in some embodiments, the increase in the thickness of the backing member 130 from the second thickness $T_2$ to the first thickness $T_1$ can be sufficient to, for example, reduce a reluctance of a portion of the backing member 130 associated with the first portions 136. Similarly stated, the arrangement of the backing member 130 can be such that the first portions 136 of the backing member 130 can have a flux carrying capacity that is greater than a flux carrying capacity of the second portions 138 of the backing member. Similarly stated, the first portions 136 of the backing member 130 can have a reluctance that is lower than a reluctance of the second portions 138 of the backing member 130, as described in further detail herein.

In some embodiments, the arrangement of the machine element 120 can be such that a size (e.g., a width) of the first portions 136 and the second portions 138 substantially correspond with a size (e.g., a width) of the magnetic poles 150 and 150'. For example, in some embodiments, a width of the first portions 136 and a width of the second portions 138 can be substantially the same as the distance $D_1$ disposed between the magnetic poles 150 and 150' (described above). In other embodiments, the width of the first portions 136 or the width of the second portions 138 can be, for example, a predetermined fraction of the distance $D_1$ (e.g., less than the distance $D_1$). Moreover, although shown in FIG. 2 as being substantially uniform, in other embodiments, the first portions 136 can have, for example, a first width and the second portions 138 can have, for example, a second width that is less than the first width, or vice versa. In still other embodiments, the at least one of the first portions 136 can have a width and/or size that is different from the remaining first portions 136 and different from the second portions 138. That is to say, in some embodiments, the shape and/or size of the first portions 136 and/or the shape and/or size of the second portions 138 can be varied.

As shown in FIG. 2, the arrangement of the set of alternating first portions 136 and second portions 138 can be such that one of the second portions 138 of the backing member 130 is substantially aligned with the first magnetic pole 150 and a different one of the second portions 138 is substantially aligned with the second magnetic pole 150'. Thus, in some embodiments, one of the first portions 136 of the backing member 130 can be substantially aligned with a midpoint of the distance $D_1$ between the magnetic poles 150 and 150'. In this manner, a section of the backing member 130 (relative to the width $W_1$ of the backing member 130) having the first thickness $T_1$ (i.e., a first portion 136) is substantially aligned with the space between the first magnetic pole 150 and the second magnetic pole 150'. In some instances, this arrangement can be such that the section of the backing member 130 can carry and/or support a magnetic flux that is greater than a magnetic flux that can be carried and/or supported by a section of the backing member 130 having the second thickness $T_2$. In this manner, the magnetic poles 150 and 150' of the machine element 120 can include magnets that are associated with and/or that produce a greater amount of magnetic flux than magnets that would otherwise be included in the machine element 120. Moreover, by selectively increasing a thickness of the backing member 130 and thus, selectively reducing the reluctance of the backing member 130, an overall weight and/or cost of the machine element 120 can be reduced when compared to, for example, a backing member having a substantially consistent thickness and associated with a similar magnetic flux.

Although the backing member 130 is shown and described above with reference to FIG. 2 as having the first thickness $T_1$ and the second thickness $T_2$, in other embodiments, a backing member can have a substantially constant thickness while selectively reducing a reluctance of at least one portion of the backing member. For example, in some embodiments, a backing member can have, for example, a width and a thickness, as described above with reference to the backing member 130, and can include a length (e.g., orthogonal to the width and the thickness) that includes a set of alternating first portions and second portions. Thus, in some embodiments, the portions of the backing member associated with, for example, an increased length can carry and/or support a greater magnetic flux than, for example, the remaining portions of the backing member.

Figure 3:
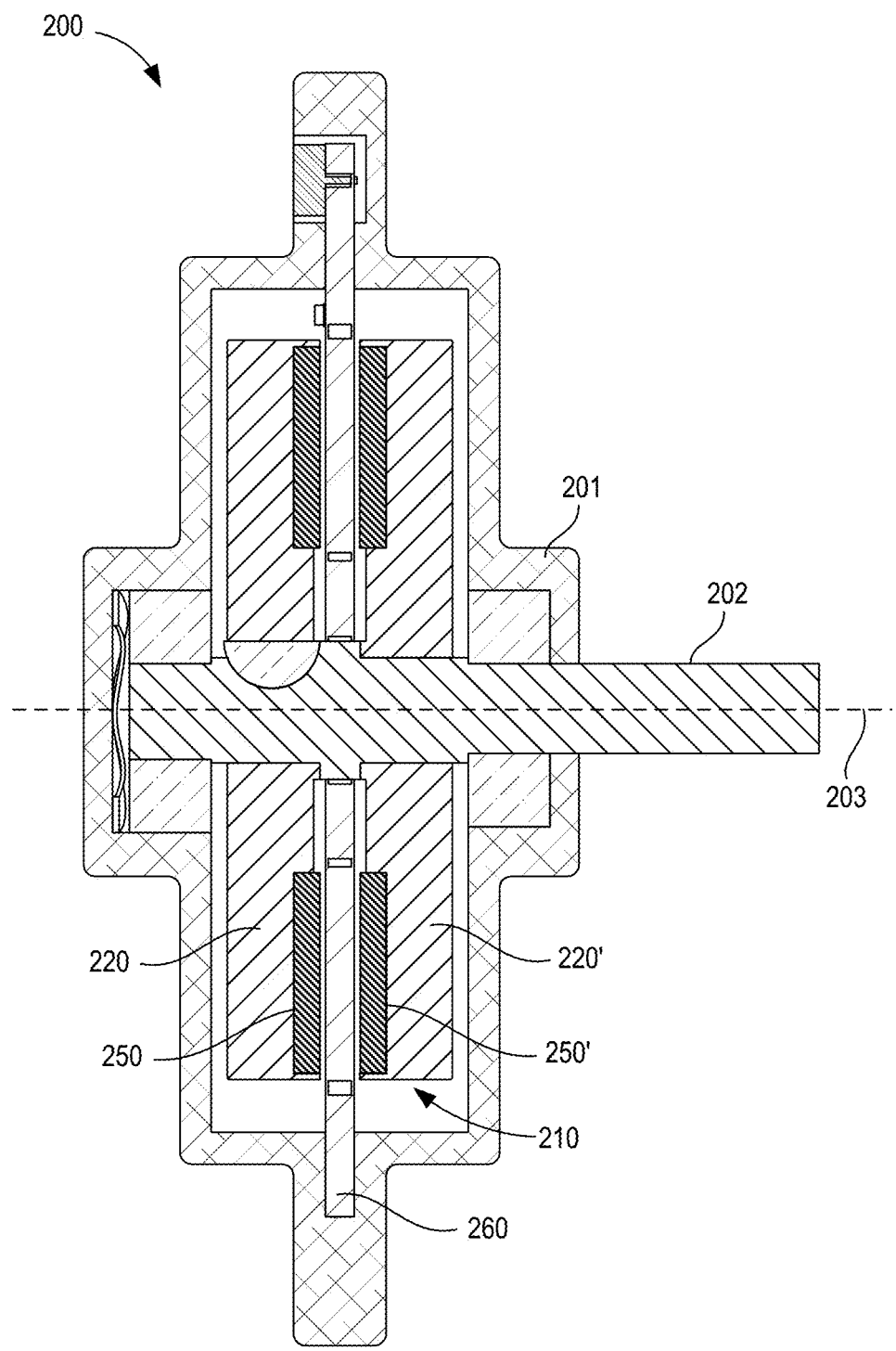
FIG. 3 is a cross-sectional illustration of a portion of an axial flux electromagnetic machine structure according to an embodiment.

As described above, any of the embodiments described herein can be included in an electromagnetic machine such as an axial flux, radial flux, conical gap, transverse flux, or linear machine. For example, the machine element 120 can be included in and/or can form a portion of a segmented stator, rotor, or the like included in an axial flux electromagnetic machine that can be operated as a motor and/or a generator. By way of example, FIG. 3 is a cross-sectional illustration of an axial flux machine structure 200 according to an embodiment. In some embodiments, the axial flux machine structure 200 (also referred to herein as "machine structure") can be included in a relatively large electromagnetic machine such as, for example, those found in wind power generators. In other embodiments, the machine structure 200 can be used in other types of electromagnetic machines and mechanisms such as, for example, other types of generators and/or motors.

The machine structure 200 can include a housing 201, a rotor assembly 210, and an annular stator assembly 260. The housing 201 substantially encloses the rotor assembly 210 and the stator assembly 260. The stator assembly 260 can be coupled to the housing 201 such that the stator assembly 260 remains in a substantially fixed position within the housing 201. The stator assembly 260 can include or support, for example, an air core type stator having a set of conductive windings. Furthermore the stator assembly 260 can be segmented to include any number of stator portions or segments that can be substantially similar to those described in the '642 application, incorporated above by reference in its entirety. Each stator segment can include at least one laminated composite assembly (e.g., at least one PCB) with one or more electrical circuits including one or more stator windings (i.e., machine windings). In some embodiments, the laminated composite assemblies can be similar to those described in the '625 patent, incorporated above by reference in its entirety. In some embodiments, each stator segment (e.g., formed by a laminated composite assembly) can include at least one stator or machine winding (e.g., included in a first portion) and a power conversion electrical circuit (e.g., included in a second portion). In this manner, each stator segment can be, for example, a modular stator segment that can be physically and electrically coupled together to form the annular segmented stator 260.

The rotor assembly 210 can include multiple rotor elements, portions, and/or segments that can be coupled together to form the rotor assembly 210. For example, in some embodiments, the rotor assembly 210 can include rotor portions 220 and 220' similar to those described in the '791 application and/or the '164 application incorporated above by reference in their entireties. The rotor assembly 210 is coupled to a drive shaft 202 that is rotatably disposed within the housing 201. Therefore, the drive shaft 202 can be rotated about an axis 203 (e.g., either directly or indirectly by a mechanical force) and, with the rotor assembly 210 coupled to the drive shaft 202, the rotor assembly 210 is rotated with the drive shaft 202. Thus, the rotor assembly 210 can rotate relative to the stator assembly 260.

The rotor assembly 210 supports and/or is coupled to a set of magnetic assemblies (e.g., a magnet assembly 250 is coupled to the rotor portion 220 and a magnet assembly 250' is coupled to the rotor portion 220'). In some embodiments, the magnetic assemblies 250 and 250' can be similar to those described in the '369 patent, the '038 patent, and/or the '083 application incorporated above by reference in their entireties. In this manner, as the rotor assembly 210 is rotated relative to the stator assembly 260, a magnetic flux flows between the poles of the magnetic assemblies 250 and 250'. Thus, an electric field is induced in or on the conductive windings (i.e., machine windings) of the stator assembly 260 that when properly gathered and delivered allows the machine structure 200 to behave as a generator or alternator. Conversely, an application of an electrical current to the conductive material of the stator assembly 260 produces Lorentz forces between the electrical current and the magnetic field of the magnetic assemblies 250 and 250'. The resultant force is a torque that can rotate the rotor assembly 210 which in turn, rotates the drive shaft 202, thereby doing work. In this manner, the machine structure 200 can behave as a motor or actuator. Although the rotor assembly 210 is described above as being coupled to the magnet assemblies 250 and 250' and the stator assembly 260 is described above as including the stator windings (e.g., machine windings), in other embodiments, the rotor assembly 210 can include rotor windings (e.g., machine windings) and the stator assembly 260 can include the magnet assemblies 250 and 250'. In other embodiments, a magnetic field may be provided by any suitable manner. In an induction machine, for instance, a suitable magnetic field may be generated by electromagnetic induction of a second set of windings as a result of current flowing through a first set of windings.

Figure 4:
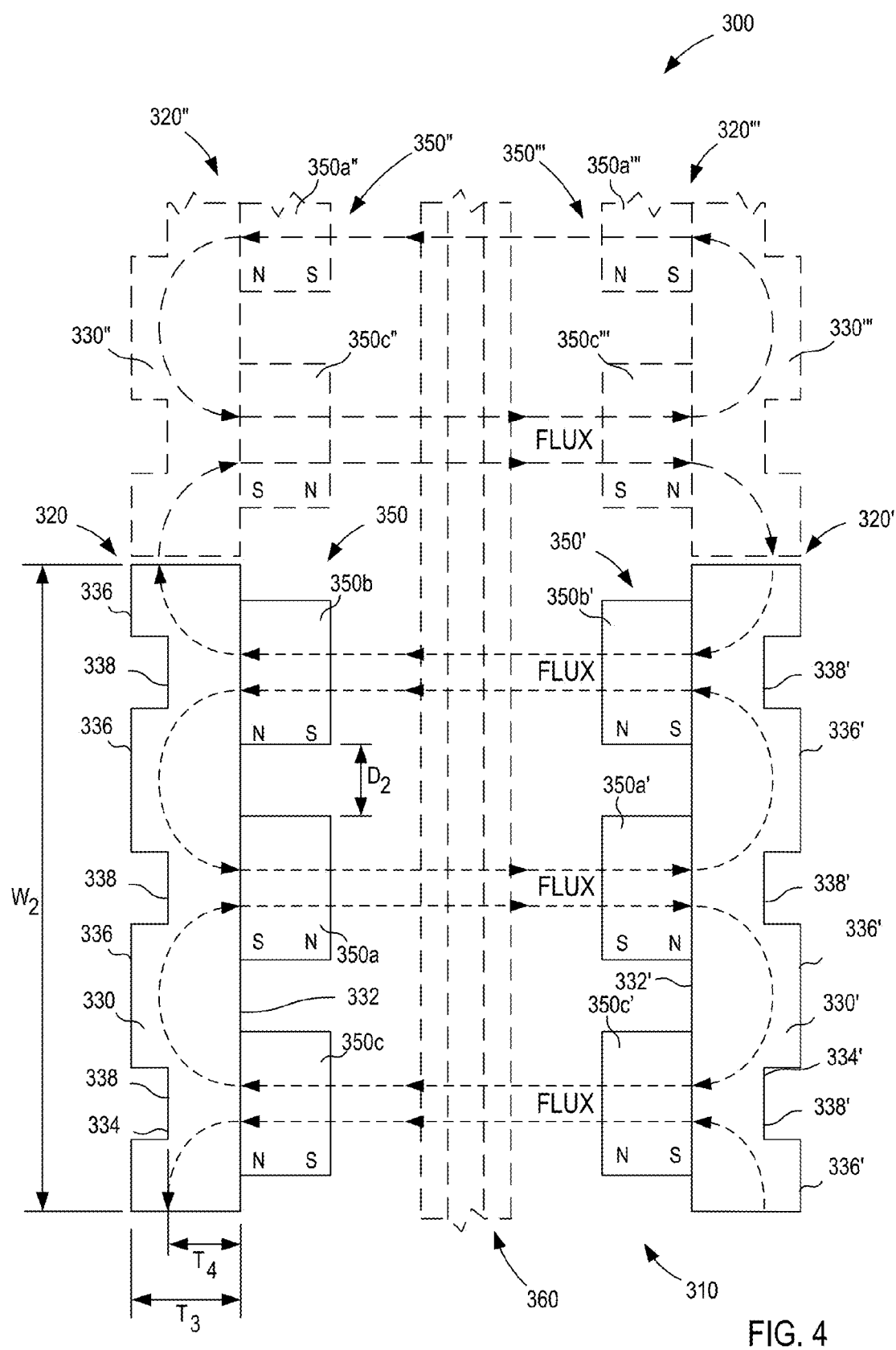
FIG. 4 is a schematic illustration of a portion of an electromagnetic machine structure according to an embodiment.

FIG. 4 is a schematic illustration of a portion of an axial flux machine structure 300 (also referred to herein as "machine structure") according to an embodiment. The machine structure 300 includes a rotor assembly 310 configured to rotate relative to a stator assembly 360 (e.g., an air core stator). The stator assembly 360 can be any suitable configuration such as those described herein. For example, in some embodiments, the stator assembly 360 can include a printed circuit board configured to encapsulate a set of windings as described, for example, in the '625 patent incorporated by reference above. Thus, the stator assembly 360 can transfer electrical current through the windings in response to magnetic flux introduced by a portion of the rotor assembly 310.

The rotor assembly 310 includes a first rotor element 320 and a second rotor element 320' disposed on opposite sides of the stator assembly 360. The first rotor element 320 and the second rotor element 320' can be substantially similar. Thus, a detailed discussion of the structure and/or form of the first rotor element 320 can also be applied to the second rotor element 320' and as such, the structure and/or form of the second rotor element 320' is not described in further detail herein.

The first rotor element 320 includes a set of magnetic poles 350 including 350a, 350b and 350c coupled to a backing member 330. The backing member 330 of the first rotor element 320 includes a first surface 332, adjacent and/or relatively closer to the stator assembly 360, and a second surface 334, opposite the first surface 332. As shown, the set of magnetic poles 350 are coupled to the first surface 332 of the backing member 330, either directly or indirectly via an intervening structure (as described above with reference to the machine element 120). The magnetic poles 350 can each be, for example, a magnetic pole as described herein and can be disposed on the backing member 330 with either the south pole or the north pole of the magnetic pole 350 facing the backing member 330. In this embodiment, the magnetic poles 350 can each be coupled to the backing member 330 such that adjacent magnetic poles 350 have opposite polarity as indicated in FIG. 4 by the south pole (labeled "S") and north pole (labeled "N") labels on the magnetic poles 350. Moreover, the magnetic poles 350 can be arranged along a width $W_2$ of the backing member 330 such that a distance $D_2$ is defined between adjacent pairs of the magnetic poles 350. Although three magnetic poles 350a, 350b, and 350c are shown and described with respect to FIG. 4, it should be understood that the first rotor element 320 can include a different number of magnetic poles 350.

The second surface 334 of the backing member 330 includes a set of alternating first portions 336 and second portions 338. The arrangement of the set of alternating first portions 336 and second portions 338 can be, for example, substantially similar to the arrangement of the set of alternating first portions 136 and second portions 138 described above with reference to the machine element 120 of FIG. 2. As such, the backing member 330 can have a first thickness $T_3$ defined between the first surface 332 and the second surface 334 at a location along the first portions 336, and can have a second thickness $T_4$ defined between the first surface 332 and the second surface 334 at a location along the second portions 338. Furthermore, as described above, although the first portions 336 and the second portions 338 are shown as being square or rectangular in shape, the first portions 336 and the second portions 338 can have various different sizes and shapes and/or configurations. For example, in some embodiments, the first portions 36 and the second portions 338 can have a size, shape, and/or configuration that is associated with, for example, a size and/or shape of the magnetic poles 350. More specifically, as shown in FIG. 4, each second portion 338 of the backing member 330 can be aligned with a different magnetic pole 350. With the first portions 336 and the second portions 338 being arranged in an alternating configuration, each first portion 336 of the backing member 330 can be aligned with the space defined between adjacent magnetic poles 350 (i.e., aligned with a midpoint of the distance $D_2$). Although the size of the first portions 136 and the second portions 138 of the backing member 130 described with respect to FIG. 2 substantially corresponded with the size of the magnetic poles 150 and 150' (i.e., substantially the same width) in the machine element 120, the backing member 330 can be arranged such that a width of the second portions 338 is smaller than a width of the magnetic poles 350 and accordingly, a width of the first portions 338 is greater than a width of the magnetic poles 350 and/or the distance $D_2$ defined therebetween, as described in further detail herein.

As shown in FIG. 4, the arrangement of the rotor assembly 310 is such the magnetic poles 350a, 350b, and 350c of the first rotor element 320 are disposed in an opposite configuration as magnetic poles 350a', 350b', and 350c' of the second rotor element 320'. Thus, each magnetic pole 350 coupled to the backing member 330 of the first rotor element 320 has a polarity opposite to that of each corresponding magnetic pole 350' coupled to the backing member 330' facing the magnetic pole 350 on an opposite side of the stator assembly 360. With the above described configuration, magnetic flux can flow between the magnetic poles 350 and 350' as shown by the dashed line flux flow paths in FIG. 4. For example, in some instances, magnetic flux can flow through a flux flow path from the magnetic pole 350a on the backing member 330 of the first rotor element 320, through an air gap in which the stator assembly 360 is disposed to the corresponding, oppositely disposed magnetic pole 350a' on the backing member 330'. The magnetic flux can then flow through the backing member 330' of the second rotor element 320' and through, for example, the adjacent magnetic pole 350b' having an opposite polarity. The magnetic flux can then flow back through the air gap (e.g., in an opposite direction) to the corresponding, oppositely disposed magnetic pole 350b adjacent to magnetic pole 350a on the backing member 330. Thus, the flow of magnetic flux across the air gap can be sufficient to induce a voltage along, for example, the windings of the stator assembly 360 when rotor elements 320 and 320' are moved with respect to stator assembly 360. Magnetic flux can flow in a similar manner from the magnetic pole 350a, through the magnetic pole 350a' and the backing member 330', to the adjacent magnetic pole 350c, as shown in FIG. 4.

As described above, the backing member 330 of the first rotor element 320 and the backing member 330' of the second rotor element 320' can carry, support, and/or direct magnetic flux between adjacent magnetic poles 350 and 350', respectively. In some embodiments, the arrangement of the set of alternating first portions 336 and second portions 338 of the backing member 330 can, for example, selectively reduce the reluctance of one or more corresponding portions of the backing member 330 and thus, such portions can carry, support, and/or direct a greater magnetic flux than one or more remaining portions of the backing member 330 without a reduced reluctance. For example, as shown in FIG. 4, the first thickness $T_3$ associated with the first portions 336 is greater than the second thickness $T_4$ associated with the second portions 338 and as such, the increase in thickness from the second thickness $T_4$ to the first thickness $T_3$ can be sufficient to reduce a reluctance of a portion of the backing member 330 associated with the first portions 336. More particularly, the arrangement of the backing member 330 can be such that a section of the backing member 330 associated with the first portions 336 can have a reluctance that is lower than a reluctance of a section of the backing member 330 associated with one of the second portions 338. Thus, the section of the backing member 330 associated with the first portions 336 can carry and/or support a magnetic flux that is greater than a magnetic flux that can be carried and/or supported by the section of the backing member 330 associated with the second portions 338. In some instances, selectively reducing the reluctance of the backing members 330 and 330' can result in, for example, magnetic flux density being distributed throughout the backing members 330 and 330' with a greater uniformity than a distribution of magnetic flux density throughout a backing member having a substantially constant reluctance due, at least in part, to a substantially constant thickness. Moreover, by selectively increasing a thickness of the backing members 330 and 330' and thus, selectively reducing the reluctance of the backing members 330 and 330', an overall weight and/or cost of the rotor assembly 310 can be reduced when compared to, for example, a backing member having a substantially consistent thickness and associated with a similar magnetic flux. In some embodiments, the selective reduction in reluctance of the backing members 330 and 330' can be such that the magnetic poles 350 and 350' can include magnets that are associated with and/or that produce a greater amount of magnetic flux than magnets that would otherwise be included in the rotor elements 320 and 320', respectively.

In some embodiments, the rotor assembly 310 can include any number of rotor elements 320 or segments disposed on both sides of the stator assembly 360. For example, a rotor assembly 310 of an electromagnetic machine can include multiple rotor elements 320. In some embodiments, the stator assembly 360 can likewise include multiple sections or segments coupled together to form the stator assembly 360. As shown in dashed lines in FIG. 4, the rotor assembly 310 can include a third rotor element 320" disposed adjacent to the first rotor element 320 and can include a similarly constructed fourth rotor element 320'" disposed on the other side of the stator assembly 360 adjacent the rotor element 320'. As indicated by the arrow in FIG. 4, magnetic flux can flow from, for example, the second magnetic pole 350b of the first rotor element 320, through the backing member 330, and into a backing member 330" of the adjacent rotor element 320". The magnetic flux can then flow through the backing member 330" of the third rotor element 320" and into a magnetic pole 350c" that is adjacent to the second magnetic pole 350b of the first rotor element 320. The magnetic flux can then flow from the magnetic pole 350" of the third rotor element 320", across the air gap (inducing a voltage along a winding portion of the stator 360 when rotor elements are moved with respect to the stator 360), through a corresponding magnetic pole 350'" and back member 330'" of the fourth rotor element 320'", through the backing member 330' and corresponding magnetic pole 350b' of the second rotor element 320', and back across the air gap to the magnetic pole 350b of the first rotor element 320.

In some embodiments, the backing member 330" of the third rotor element 320" can be substantially similar to the backing member 330 and can be disposed relative to the backing member 330 such that a reluctance between the backing member 330" of the third rotor element 320" and the backing member 330 of the first rotor element 320 is not substantially increased. That is to say, a flow of magnetic flux between the first rotor element 320 and the third rotor element 320" can have substantially the same magnetic flux density as a flow of magnetic flux through a section of the backing member 330 associated with the first portion 336 such as, for example, between the magnet poles 350a and 350b. For example, in some embodiments, the third rotor element 320" can be disposed sufficiently close to the first rotor element 320 such that magnetic flux flows therebetween, for example, as if through a continuous backing member. In other embodiments, an end portion of the backing member 330 included in the first rotor element 320 and an adjacent end portion of the backing member 330" included in the third rotor element 320" can have a third thickness that is greater than the first thickness $T_3$ associated with the first portions 336 of the backing member 330. As such, an increase in reluctance as a result of, for example, an air gap between the end portions can be offset and/or otherwise mitigated by the increase in the thickness of the end portions. Thus, magnetic flux can flow between the backing member 330 of the first rotor element 320 and the backing member 330" of the third rotor element 320" with a substantially similar magnitude as, for example, a flow of magnetic flux through the section of the backing member 330 associated with the first portion 336 from the magnetic pole 350b to the magnetic pole 350a.

Although not described in detail above, magnetic flux can flow between the third rotor element 320" and the fourth rotor element 320'" in a substantially similar manner as described above with reference to the first rotor element 320 and the second rotor element 320', respectively. For example, as shown in FIG. 4, magnetic flux can flow between a set of magnetic poles 350" (e.g., magnetic poles 350c" and 350a") and backing member 330" of the third rotor element 320" and a set of magnetic poles 350'" (e.g., magnetic poles 350c'" and 350a'") and backing member 330' of the fourth rotor element 320'" in a substantially similar manner as described above.

FIG. 5 is a schematic illustration of a portion of a machine element 420 according to an embodiment. The machine element 420 (also referred to herein as "element") can be disposed in a machine such as, for example, an axial flux, radial flux, conical gap, transverse flux, or translational linear electromagnetic machines, as described above. In some embodiments, the machine element 420 can be a rotor element configured to rotate relative to a stator assembly (e.g., rotates with the direction of flux from rotor to stator generally in the axial or radial direction) or can move linearly relative to the stator assembly. In some embodiments, the machine element 420 can be a rotor element that is disposed on substantially one side of a stator assembly, where a stator assembly can provide its own flux return, such as commonly practiced iron-core machines. In other embodiments, the machine element 420 can be a rotor element of a two-sided rotor assembly, where rotor elements are disposed on either side of a stator assembly, such as the embodiment described in FIG. 4.

The machine element 420 includes a set of magnetic poles 450 coupled to a backing member 430. The backing member 430 of the machine element 420 includes a first surface 432 and a second surface 434, opposite the first surface 432. As shown, the set of magnetic poles 450 are coupled to the first surface 432 of the backing member 430, either directly or indirectly via an intervening structure (as described above with reference to the machine element 120). The magnetic poles 450 can each be, for example, a magnetic pole as described herein and can be disposed on the backing member 430 with either the south pole or the north pole of the magnetic pole 450 facing the backing member 430. In this embodiment, the magnetic poles 450 can each be coupled to the backing member 430 such that adjacent magnetic poles 450 have opposite polarity as indicated in FIG. 5 by the south pole (labeled "S") and north pole (labeled "N") labels on the magnetic poles 450. Moreover, the magnetic poles 450 can be arranged along a width $W_3$ of the backing member 430 such that a distance $D_3$ is defined between adjacent pairs of the magnetic poles 450. Similarly stated, each magnetic pole 450 is spaced apart from adjacent magnetic poles 450 at a substantially similar distance (e.g., the distance $D_3$). Although six magnetic poles 450 are shown and described with respect to FIG. 5, it should be understood that the machine element 420 can include a different number of magnetic poles 450. Moreover, although only a portion of the machine element 420 is shown in FIG. 5, the machine element 420 can, for example, form a rotor or stator section or segment, or can substantially form the entire machine element of, for example, a rotor or stator. For example, in some embodiments, the backing member 430 and the magnetic poles 450 can form a substantially annular non-segmented rotor element having a substantially symmetric arrangement. Thus, each magnetic pole 450 can be spaced apart from adjacent magnetic poles 450 by the distance $D_3$, for example, along the first surface of the substantially annular backing member 430.

The second surface 434 of the backing member 430 includes a set of alternating first portions 436 and second portions 438. The arrangement of the set of alternating first portions 436 and second portions 438 can be, for example, substantially similar to the arrangement of the set of alternating first portions 136 and second portions 138 described above with reference to the machine element 120 of FIG. 2. As such, the backing member 430 can have a first thickness $T_5$ defined between the first surface 432 and the second surface 434 at a location along the first portions 436, and can have a second thickness $T_6$ defined between the first surface 432 and the second surface 434 at a location along the second portions 438. Furthermore, as described above, the first portions 436 and the second portions 438 can have a size, shape, and/or configuration that is associated with, for example, a size and/or shape of the magnetic poles 450.

As shown in FIG. 5, a centerline or midpoint of each second portion 438 of the backing member 430 can be aligned with a centerline or midpoint of a different magnetic pole 450. With the first portions 436 and the second portions 438 being arranged in an alternating configuration, a centerline or midpoint of each first portion 436 of the backing member 430 can be aligned with a centerline or midpoint of the space defined between adjacent magnetic poles 450 (i.e., aligned with a midpoint of the distance $D_3$). Although the first portions 136 and 336 and the second portions 138 and 338 of the machine elements 120 and 320, respectively, are shown as having substantially polygonal shapes (e.g., rectangular or square) including substantially rectilinear surfaces, the arrangement of the backing member 430 can be such that the second surface 434 is substantially curvilinear. For example, in some embodiments, the second surface 434 of the backing member 430 can form a sine wave or the like. In other words, the arrangement of the second surface 434 can be such that the set of alternating first portions 436 and second portions 438 form a substantially smooth wave-like surface having a substantially constant amplitude. Said yet another way, the first portions 436 and the second portions 438 can have a substantially similar size and shape, and can be arranged in opposite orientations in an alternating manner, as shown in FIG. 5.

In some embodiments, the arrangement of the set of alternating first portions 436 and second portions 438 of the backing member 430 can, for example, selectively reduce the reluctance of one or more corresponding portions of the backing member 430 and thus, such portions (i.e., first portions 436) can carry, support, and/or direct a greater magnetic flux than one or more remaining portions of the backing member 430 without a reduced reluctance. For example, as shown in FIG. 5, the first thickness $T_5$ associated with the first portions 436 is greater than the second thickness $T_6$ associated with the second portions 438 and as such, the increase in thickness from the second thickness $T_6$ to the first thickness $T_5$ can be sufficient to reduce a reluctance of a section of the backing member 430 associated with the first portions 436, as described in detail above with reference to the machine element 120 in FIG. 2. Thus, the section of the backing member 430 associated with the thicker portions of the backing member 430 (i.e., first portions 436) can carry and/or support a magnetic flux which can be greater than a magnetic flux that can be carried and/or supported by the thinner portions of the backing member 430 associated with the second portions 438. Moreover, in some instances, the flow of magnetic flux through the machine element 420 can be such that a magnetic flux at a position along the width $W_3$ of the backing member 430 corresponding to a region of the second portions 438 that is aligned with, for example, a center portion of the magnetic poles 450 approaches or is substantially zero. Similarly stated, in some instances, a region of the second portions 438 aligned with a center portion of the magnetic poles 450 may not carry and/or support a flow of magnetic flux therethrough. In some instances, selectively reducing the reluctance of the backing member 430 can, for example, result in a magnetic flux density that is distributed throughout the backing member 430 with a greater uniformity than a distribution throughout a backing member having a substantially constant reluctance.

As shown in FIG. 5, in some embodiments, the arrangement of the substantially curvilinear second surface 434 can, for example, correspond with, model, and/or approximate, a curvilinear flow path of the magnetic flux through the backing member 430. In this manner, the magnetic poles 450 can include magnets that are associated with and/or that produce a greater amount of magnetic flux than magnets that would otherwise be included in the machine element 420. Moreover, by selectively increasing a thickness of the backing member 430 and thus, selectively reducing its reluctance, an overall weight and/or cost of the machine element 420 can be reduced when compared to, for example, a backing member having a substantially consistent thickness and associated with a similar magnetic flux.

Although the arrows in FIG. 5 indicate a substantially equal amount of magnetic flux flowing from one magnetic pole 450 to the adjacent magnetic poles 450, in other embodiments, the arrangement of a machine element can be such that an unequal amount of magnetic flux flows from a magnetic pole to an adjacent magnetic pole (e.g., as a result of magnetic poles being arranged in, for example, magnetic pole pairs and/or the like). For example, FIG. 6 is a schematic illustration of a portion of a machine element 520 according to an embodiment. The machine element 520 (also referred to herein as "element") can be disposed in a machine such as, for example, an axial flux, radial flux, conical gap, transverse flux, or translational linear electromagnetic machines, as described above. In some embodiments, the machine element 520 can be a rotor element configured to rotate relative to a stator assembly (e.g., rotates with the direction of flux from rotor to stator generally in the axial or radial direction) or can move linearly relative to the stator assembly.

The machine element 520 includes a backing member 530 coupled to a set of magnetic poles 550. The backing member 530 of the machine element 520 includes a first surface 532 and a second surface 534, opposite the first surface 532. As shown, the set of magnetic poles 550 are coupled to the first surface 532 of the backing member 530, either directly or indirectly via an intervening structure (as described above with reference to the machine element 120). The magnetic poles 550 can each be a magnetic pole such as those described herein, and can be arranged along a width $W_4$ of the backing member 530 such that a distance $D_4$ is defined between each adjacent pair of the magnetic poles 550, as described in detail above. As shown in FIG. 6, the magnetic poles 550 are disposed in an alternating manner on the backing member 530 with either the south pole (labeled "S") or the north pole (labeled "N") of the magnetic pole 550 facing the backing member 530. Although six magnetic poles 550 are shown and described with respect to FIG. 6, it should be understood that the machine element 520 can include a different number of magnetic poles 550. Moreover, although only a portion of the machine element 520 is shown in FIG. 6, the machine element 520 can form a segment of a rotor or substantially the entire rotor, as described above with reference to the machine element 420 in FIG. 5.

As shown in FIG. 6, the magnetic poles 550 can be arranged in, for example, magnetic pole pairs 540. For example, in some embodiments, the magnetic poles 550 can include flux focusing magnets such as those described in the '038 patent and/or the '369 patent (incorporated by reference above), which can be arranged such that a majority of the magnetic flux associated with each magnetic pole 550 in that magnetic pole pair 540 flows between the magnetic poles 550 in that magnetic pole pair 540. In some embodiments, the magnetic poles 550 included in a magnetic pole pair 540 can be coupled to a common structure such as, for example, those described in the '791 application (incorporated by reference above), which in turn, is coupled to the backing member 530. In this manner, a majority of a magnetic flux associated with the magnetic poles 550 included in the magnetic pole pair 540 can flow therebetween via the common structure and the backing member 530. Although the magnetic poles 550 are shown and described with reference to FIG. 6 as being evenly spaced apart by the distance $D_4$, in other embodiments, the magnetic poles 550 included in each magnetic pole pair 540 can be spaced apart by a distance that is smaller than a distance between adjacent magnetic poles 550 in adjacent magnetic pole pairs 540. Moreover, although only a portion of the machine element 520 is shown in FIG. 6, the machine element 520 can be a portion of a segment or section of a machine structure such as a rotor or stator, or can form, for example, substantially the entire machine structure such as, a rotor or a stator. For example, the backing member 530 and the magnetic poles 550 can form a substantially annular non-segmented rotor element having a substantially symmetric arrangement, as described above with reference to the machine element 420 of FIG. 5.

The second surface 534 of the backing member 530 includes a set of alternating first portions 536 and second portions 538. In this embodiment, the backing member 530 can have a first thickness $T_7$ defined between the first surface 532 and the second surface 534 at a location associated with each of the first portions 536, and can have a second thickness $T_8$ defined between the first surface 532 and the second surface 534 at a location associated with each of the second portions 538. Furthermore, as shown in FIG. 6, a centerline or midpoint of each first portion 536 of the backing member 530 can be aligned with a centerline or midpoint of the space defined between adjacent magnetic poles 550 included in the same magnetic pole pair 540 (i.e., aligned with a midpoint of the distance $D_4$). A centerline or midpoint of each second portion 538 of the backing member 530 can be aligned with a centerline or midpoint of the space defined between adjacent magnetic poles 550 of different magnetic pole pairs 540. Said another way, a center region of the first portions 536 of the backing member 530 can be aligned with, for example, a center region of a corresponding magnetic pole pair 540, and a center region of the second portions 538 of the backing member 530 can be aligned with, for example, a center region disposed between one magnetic pole 550 from adjacent magnetic pole pairs 540. That is to say, the center region of the second portions 538 can be aligned with a center region of the space defined between two adjacent magnetic poles 550 from different magnetic pole pairs 540 (i.e., adjacent magnetic pole pairs 540).

In some embodiments, the arrangement of the set of alternating first portions 536 and second portions 538 of the backing member 530 can, for example, selectively reduce the reluctance of one or more corresponding portions of the backing member 530 and thus, such portions can carry, support, and/or direct a greater magnetic flux than one or more remaining portions of the backing member 530 without a reduced reluctance. For example, as shown in FIG. 6, the first thickness $T_7$ associated with the first portions 536 is greater than the second thickness $T_8$ associated with the second portions 538 and as such, the increase in thickness from the second thickness $T_8$ to the first thickness $T_7$ can be sufficient to reduce a reluctance of a section of the backing member 530 associated with the first portions 536, as described in detail above with reference to the machine element 120 in FIG. 2. Thus, the section of the backing member 530 associated with the first portions 536 can carry and/or support a magnetic flux that is greater than a magnetic flux that can be carried and/or supported by the section of the backing member 530 associated with the second portions 538. Expanding further, the first portions 536 of the backing member 530 can carry and/or can support the flow of magnetic flux between the magnetic poles 550 included in the magnetic pole pairs 540 (as described above), which can have a magnetic flux greater than, for example, a magnetic flux between two adjacent magnetic poles 550 of different magnetic pole pairs 540, as shown in FIG. 6. In this manner, the first thickness $T_7$ of the first portions 536 of the backing member 530 can be such that the first portions 536 have a permeability and/or saturation flux density sufficient to support the magnetic flux density associated with a flow of magnetic flux of a corresponding magnetic pole pair 540, for example. Similarly, the second thickness $T_8$ of the second portions 538 of the backing member can be such that the second portions 538 have a permeability and/or saturation flux density sufficient to support a magnetic flux density associated with a flow of magnetic flux between the magnetic pole pairs 540.

Figure 7:
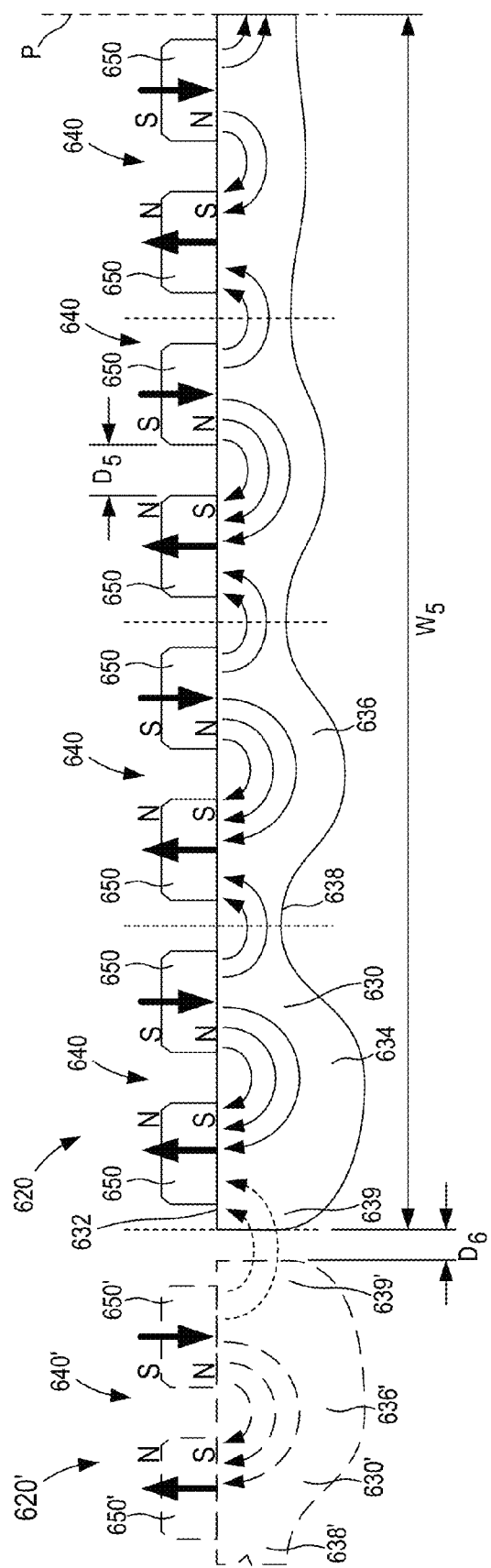

Although the machine elements 420 and 520 are described above as forming, for example, substantially an entire machine structure with continuous and symmetric backing members 430 and 530, respectively, in other embodiments, a machine element can be included in a segmented machine structure such as, for example, a segmented rotor or a segmented stator. For example, FIG. 7 is a schematic illustration of a portion of a machine element 620 according to an embodiment. The machine element 620 can be disposed in a machine such as, for example, an axial flux, radial flux, conical gap, transverse flux, or translational linear electromagnetic machines. In some embodiments, the machine element 620 can be a rotor element configured to rotate relative to a stator assembly (e.g., rotates with the direction of flux from rotor to stator generally in the axial or radial direction) or can move linearly relative to the stator assembly, as described in detail above.

The machine element 620 includes a set of magnetic poles 650 coupled to a backing member 630. The backing member 630 of the machine element 620 includes a first surface 632 and a second surface 634, opposite the first surface 632. As shown, the set of magnetic poles 650 are coupled to the first surface 632 of the backing member 630, either directly or indirectly via an intervening structure (as described above with reference to the machine element 120). The magnetic poles 650 can each be a magnetic pole such as those described herein, and can be arranged along a width $W_5$ of the backing member 630 such that a distance $D_5$ is defined between each adjacent pair of the magnetic poles 650, as described in detail above. Although only a portion of the machine element 620 is shown in FIG. 7, the machine element 620 can form a segment of, for example, a segmented rotor or a segmented stator. As such, the machine element 620 can be substantially symmetrical about a plane P intersecting, for example, a center of the backing member 630. More specifically, FIG. 7 illustrates a first half of the machine element 620 and thus, the width $W_5$ of the backing member 630 shown in FIG. 7 is substantially half a total width of the backing member 630. Accordingly, magnetic poles (not shown in FIG. 7) can be arranged along a width of a second half of the backing member 630 in a similar manner, yet with an opposite polarity. That is to say, an arrangement of magnetic poles along the width of the backing member 630 (e.g., the first half, shown in FIG. 7, and the second half, not shown in FIG. 7) substantially alternates from one width end to the opposite width end. Thus, with the machine element 620 being symmetric about the plane P, a discussion of the first half of the machine element 620, shown in FIG. 7, can apply to the second half of the machine element 620, not shown in FIG. 7, unless explicitly stated otherwise.

As shown in FIG. 7, the magnetic poles 650 are disposed in an alternating manner on the backing member 630 with either the south pole (labeled "S") or the north pole (labeled "N") of the magnetic pole 650 facing the backing member 630. As shown in FIG. 7, the magnetic poles 650 can be arranged in, for example, magnetic pole pairs 640. For example, in some embodiments, the magnetic poles 650 of a magnetic pole pair 640 can include flux focusing magnets, can be coupled to a common structure, and/or can otherwise be grouped together such that a majority of a magnetic flux associated with the magnetic poles 650 included in the magnetic pole pair 640 can flow therebetween, as described in detail above with reference to the machine element 520 in FIG. 6.

The second surface 634 of the backing member 630 includes a set of alternating first portions 636 and second portions 638. The arrangement of the set of alternating first portions 636 and second portions 638 can be, for example, substantially similar in form and/or function to the arrangement of the set of alternating first portions 536 and second portions 538 described above with reference to the machine element 520 of FIG. 6. The arrangement of the set of alternating first portions 636 and second portions 638 can differ from the arrangement of the set of alternating first portions 536 and second portions 538 of the machine element 520, however, in that a thickness of the backing member 630 varies, for example, between an end portion 639 and the plane P (i.e., the plane of symmetry substantially at the center of the backing member 630). For example, while the first portions 536 and the second portions 538 of the backing member 530 are each associated with the first thickness $T_7$ and the second thickness $T_8$, respectively (as shown in FIG. 6), a thickness associated with each of the first portions 636 successively decreases from the end portion 639 of the backing member 630 to the center of the backing member 630 (e.g., at the plane of symmetry P), and a thickness associated with each of the second portions 638 successively increases from the end portion 639 of the backing member 630 to the center of the backing member 630, as shown in FIG. 7. Expanding further, with the machine element 620 forming, for example, a segment of a machine structure (e.g., a rotor segment of a segmented rotor), a magnetic flux can vary along, for example, the width $W_5$ of the backing member 630. For example, as described above, while a majority of the magnetic flux associated with each magnetic pole 650 in one of the magnetic pole pairs 640 flows between the magnetic poles 650 of that magnetic pole pair 640, a portion of the magnetic flux associated with the magnetic poles 650 of that magnetic pole pair 640 can flow to, for example, a magnetic pole 650 of an adjacent magnetic pole pair 640. Relating to the machine element 620, an amount of magnetic flux flowing between a first magnetic pole pair 640 and a second magnetic pole pair 640 can successively increase along the width $W_5$ of the backing member 630 from, for example, the end portion 639 to the plane of symmetry P of the backing member 630. Accordingly, as shown in FIG. 7, the thickness of the first portions 636 decrease along the width $W_5$ of the backing member 630 from the end portion 639 to the plane of symmetry P of the backing member 630, and the thickness of the second portions 638 increase from the end portion 639 to the plane of symmetry P of the backing member 630. In this manner, the first portions 636 and the second portions 638 of the backing member 630 can have a permeability and/or saturation flux density sufficient to support the magnetic flux density associated with a flow of magnetic flux between the magnetic poles 650 of the magnetic pole pairs 640 and a flow of magnetic flux between adjacent magnetic pole pairs 640, for example, without approaching and/or reaching magnetic saturation.

As described above, in some embodiments, the machine element 620 can be, for example, a segment of a machine structure. In such embodiments, the machine element 620 (e.g., a first machine element 620) can be coupled to and/or otherwise disposed adjacent to, for example, a second machine element 620', as shown in FIG. 7. As indicated by the dashed arrows in FIG. 7, magnetic flux can flow from, for example, the magnetic pole 650 of the first machine element 620 (e.g., the magnetic pole 650 adjacent to the end portion of the backing member 630), through the end portion 639 of the backing member 630, and into an end portion 639' of a backing member 630' included in the second machine element 620'. The magnetic flux can then flow through the end portion 639' of the backing member 630' of the second machine element 620' and into a magnetic pole 650' that is adjacent to the magnetic pole 650 of the first machine element 620.

In some embodiments, the backing member 630' of the second machine element 620' can be substantially similar to the backing member 630 and can be disposed relative to the backing member 630 such that a reluctance between the end portion 639' of the backing member 630' of the second machine element 620' and the end portion 639 of the backing member 630 of the first machine element 620 is not substantially increased. That is to say, a flow of magnetic flux between the first machine element 620 and the second machine element 620' can have substantially the same magnetic flux as a flow of magnetic flux through a section of the backing member 630 associated with the second portion 638 such as, for example, between the magnetic pole pairs 640 of the first machine element 620 and/or associated with a second portion 638' of the backing member 630' between the magnetic poles 650' forming, for example, a magnetic pole pair 640'. For example, in some embodiments, the second machine element 620' can be disposed sufficiently close to the first machine element 620 such that magnetic flux flows between the end portion 639' of the backing member 630' and the end portion 639 of the backing member 630, respectively, for example, as if through a continuous backing member.

In other embodiments, the end portion 639 of the backing member 630 included in the first machine element 620 and the adjacent end portion 639' of the backing member 630' included in the second machine element 620' can have a thickness that is greater than the thicknesses associated with the first portions 636 and 636' and/or the second portions 638 and 638' of the backing members 630 and 630', respectively. As such, an increase in reluctance as a result of, for example, an air gap associated with a distance $D_6$ between the end portions 639 and 639' can be offset and/or otherwise mitigated by the increase in the thickness of the end portions 639 and 639'. Thus, magnetic flux can flow between the backing member 630 of the first machine element 620 and the backing member 630' of the second machine element 620' with a substantially similar magnitude as, for example, a flow of magnetic flux through the backing member 630 associated with the first portions 636 and/or the second portions 638 and/or a flow of magnetic flux through the backing member 630' associated with the first portions 636' and/or the second portions 638'.

Figure 8:
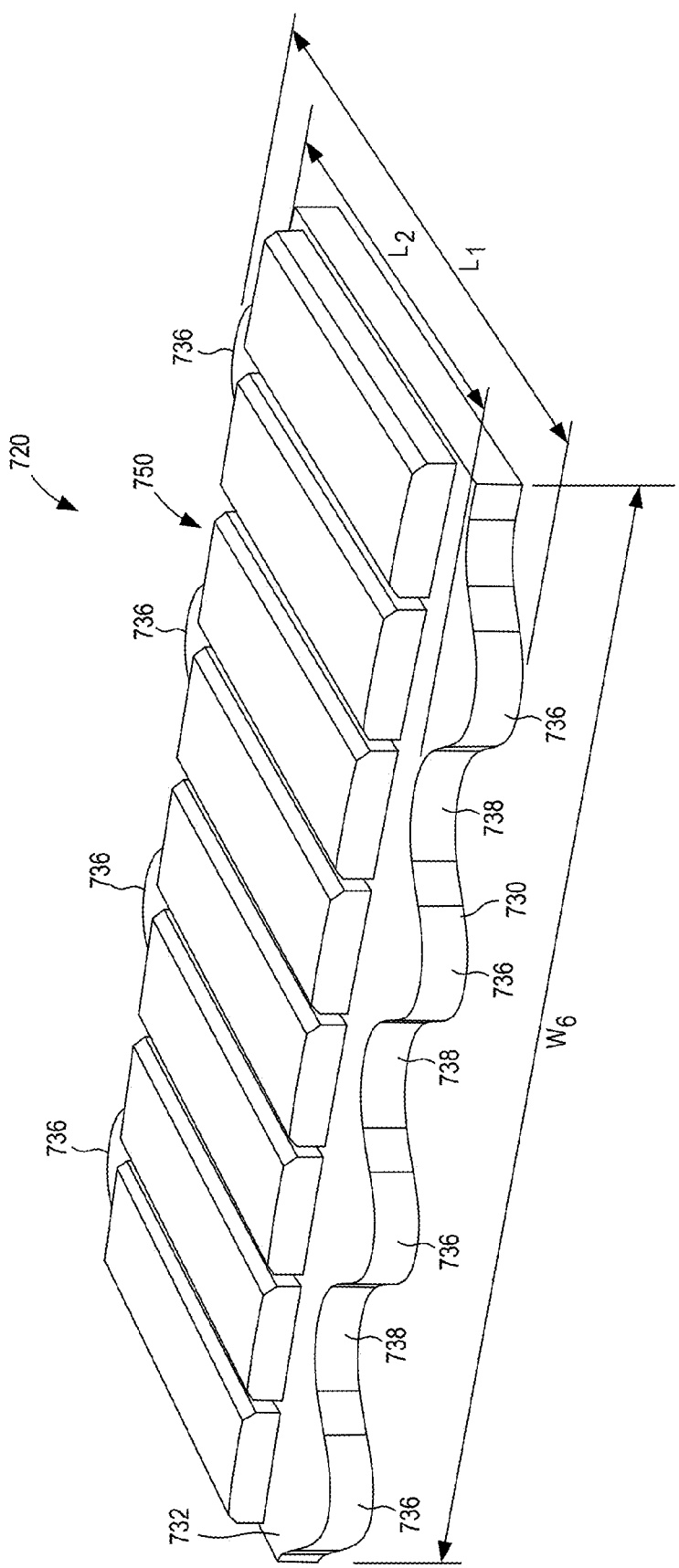
FIG. 8 is a schematic illustration of a machine element for an electromagnetic machine according to an embodiment.

Although the backing members 330, 430, 530, and 630 have been shown and described above as having a thickness that varies along its width, in other embodiments, a machine segment can include a backing member that has a length that is varied along its width. For example, FIG. 8 is a schematic illustration of a portion of a machine element 720 according to an embodiment. The machine element 720 can be disposed in a machine structure such as, for example, an axial flux, radial flux, conical gap, transverse flux, or translational linear electromagnetic machines, as described above. In some embodiments, the machine element 720 can be a rotor element configured to rotate relative to a stator assembly (e.g., rotates with the direction of flux from rotor to stator generally in the axial or radial direction) or can move linearly relative to the stator assembly. In some embodiments, the machine element 720 can form, for example, substantially the entire machine structure such as, a rotor or a stator. For example, the backing member 730 and the magnetic poles 750 can form a substantially annular non-segmented rotor element having a substantially symmetric arrangement, as described above with reference to the machine element 420 of FIG. 5. In other embodiments, the machine element 720 can be, for example, a machine element included in a segmented machine structure such as, for example, a segmented rotor or a segmented stator.

The machine element 720 includes a set of magnetic poles 750 coupled to a backing member 730. As shown, the set of magnetic poles 750 are coupled to a surface 732 of the backing member 730, either directly or indirectly via an intervening structure (as described above with reference to the machine element 120). The magnetic poles 750 can each be a magnetic pole such as those described herein, and can be arranged along a width $W_6$ of the backing member 730 in an alternating manner on the backing member 730 with either the south pole or the north pole of the magnetic pole 750 facing the backing member 730, as described in detail above. In some embodiments, the magnetic poles 750 can be arranged in magnetic pole pairs and/or the like, as described above with reference to the machine elements 520 and 620. In other embodiments, the magnetic poles 750 need not be arranged in magnetic pole pairs, as described above, for example, with reference to the machine elements 320 and 420.

Although the thicknesses of the backing members 330, 430, 530, and 630 have been shown and described as varying along its width, the backing member 730 can have a substantially constant thickness. As shown in FIG. 8, the backing member 730, however, can have a length that is varied along its width $W_6$. As such, the backing member 730 includes a set of alternating first portions 736 and second portions 738 that can be similar in at least function to the set of alternating first portions and second portions of the embodiments described above. Thus, the backing member 730 can have a first length $L_1$ and a second length $L_2$. The first length $L_1$ can be associated with a distance between two opposite first portions 736 and the second length $L_2$ can be associated with a distance between two opposite second portions 738. As shown in FIG. 8, each first portion 736 of the backing member 730 can be aligned with the space defined between adjacent magnetic poles 750 included in, for example, a magnetic pole pair and each second portion 738 of the backing member 730 can be aligned with the space defined between adjacent magnetic poles 750 of different magnetic pole pairs. Said another way, a center region of the first portions 736 of the backing member 730 can be aligned with, for example, a center region of a corresponding magnetic pole pair, and a center region of the second portions 738 of the backing member 730 can be aligned with, for example, a center region disposed between one magnetic pole 750 from adjacent magnetic pole pairs. That is to say, the center region of the second portions 738 can be aligned with a center region of the space defined between two adjacent magnetic poles 750 from different magnetic pole pairs. In embodiments in which the backing member 730 is not arranged in a manner to form magnetic pole pairs, the first portions 736 and the second portions 738 can be arranged in a similar manner as, for example, the first portions 336 and the second portions 338 of the backing member 330 in FIG. 4.

In some embodiments, the arrangement of the set of alternating first portions 736 and second portions 738 of the backing member 730 can, for example, selectively reduce the reluctance of one or more corresponding portions of the backing member 730 and thus, such portions can carry, support, and/or direct a greater magnetic flux than one or more remaining portions of the backing member 730 without a reduced reluctance. For example, as shown in FIG. 8, the first length $L_1$ associated with the first portions 736 is greater than the second length $L_2$ associated with the second portions 738 and as such, the increase in length from the second length $L_2$ to the first length $L_1$ can be sufficient to reduce a reluctance of a section of the backing member 730 associated with the first portions 736, as described in detail above with reference to the machine element 120 in FIG. 2.

Thus, the backing member 730 can be configured to carry and/or support a flow of magnetic flux without approaching and/or reaching saturation, as described in detail above with reference to the machine segments 320, 420, 520, and/or 620.

Although machine segments 320, 420, 520, and 620 are shown and described as including the backing members 330, 430, 530, and 630, respectively, that each have a varying thickness and the machine element 720 is shown and described as including the backing member 730 that has a varying length, in some embodiments, a machine segment can include a backing member with, for example, a varying thickness and a varying length. As such, the machine segment can function in a substantially similar manner as those described in detail above.

Figure 9:
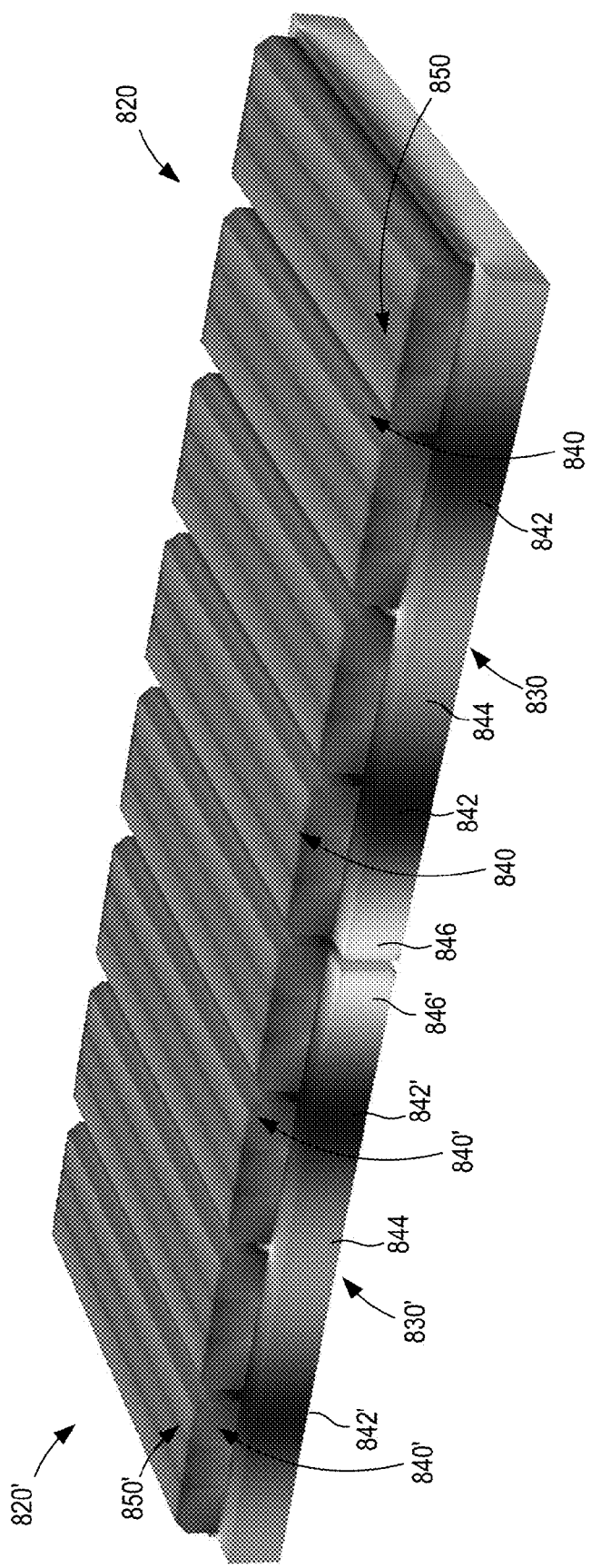
FIG. 9 is a perspective view of a portion of a first machine element and a portion of a second machine element illustrating magnetic flux density therein, according to an embodiment.

Referring now to FIG. 9, a first machine element 820 and a second machine element 820' are shown according to an embodiment. The first machine element 820 and the second machine element 820' can be substantially similar to each other. Moreover, the machine elements 820 and 820' can be substantially similar to any of the machine segments 120, 320, 420, 520, 620, and/or 720 described in detail above. Thus, similar aspects of the machine elements 820 and 820' are not described in further detail herein.

As shown in FIG. 9, the first machine element 820 includes a backing member 830 and a set of magnetic poles 850. As described in detail above with reference to the machine element 520 in FIG. 6, the backing members 820 and 820' can be arranged in a manner that forms and/or supports magnetic pole pairs 840. Thus, as described in detail above, the backing member 830 of the first machine element 820 can be configured to carry and/or support a flow of magnetic flux between the magnetic poles 850 of the magnetic pole pairs 840 and a flow of magnetic flux between the magnetic pole pairs 840. Similarly, the second machine element 820' includes a backing member 830' and a set of magnetic poles 850 that are arranged into magnetic pole pairs 840'. The backing member 830' of the second machine element 820 can be configured to carry and/or support a flow of magnetic flux between the magnetic poles 850' of the magnetic pole pairs 840' and a flow of magnetic flux between the magnetic pole pairs 840'.

As described in detail above, the arrangement of the machine segments 820 and 820' can be such that an amount of magnetic flux through the backing members 830 and 830', respectively, can vary along a width of the backing members 830 and 830', respectively. For example, as shown in FIG. 9, regions 842 (i.e., the regions with a darker shading) can be associated with a flow of magnetic flux between the magnetic poles 850 of the same magnetic pole pair 840 and thus, represent a region of higher magnetic flux density; a region 844 can be associated with a flow of magnetic flux between the adjacent magnetic pole pairs 840 and thus, represents a region of lower magnetic flux density; and a region 846 can be associated with a flow of magnetic flux at or near an end portion, which in this embodiment, can be substantially negligible. In a similar manner, the backing member 830' of the second machine element 820' includes regions 842', 844', and 846' that correspond to the regions 842, 844, and 846 of the backing member 830 of the first machine element 820. As shown in FIG. 9, with the backing members 830 and 830' having a substantially constant thickness and/or length, the regions 842 and 842' respectively, can be, for example, approaching magnetic saturation in response to the higher magnetic flux density.

As described in detail above, in some embodiments, a thickness and/or a length of the backing members 830 and 830' can be selectively increased to selectively reduce the reluctance of the backing members 830 and 830', which in turn, can reduce a degree of magnetic saturation. For example, in some embodiments, the backing members 830 and 830' can include a set of alternating first portions, having a first thickness, and second portions, having a second thickness that is less than the first thickness. Thus, the first portions can be aligned with and/or otherwise associated with, for example, the regions 842 and the second portions can be aligned with and/or otherwise associated with, for example, the region 844, as described in detail above with reference to the backing member 530 in FIG. 6. Similarly, the second backing member 830' can include a set of alternating first portions and second portions that are arranged in a like manner. Hence, the backing member 830 of the first machine element 820 can be configured to carry and/or support a magnetic flux associated with the regions 842 and 844 without approaching and/or reaching saturation and the backing member 830' of the second machine element 820' can be configured to carry and/or support a magnetic flux associated with the regions 842' and 844' without approaching and/or reaching saturation.

Figure 10:
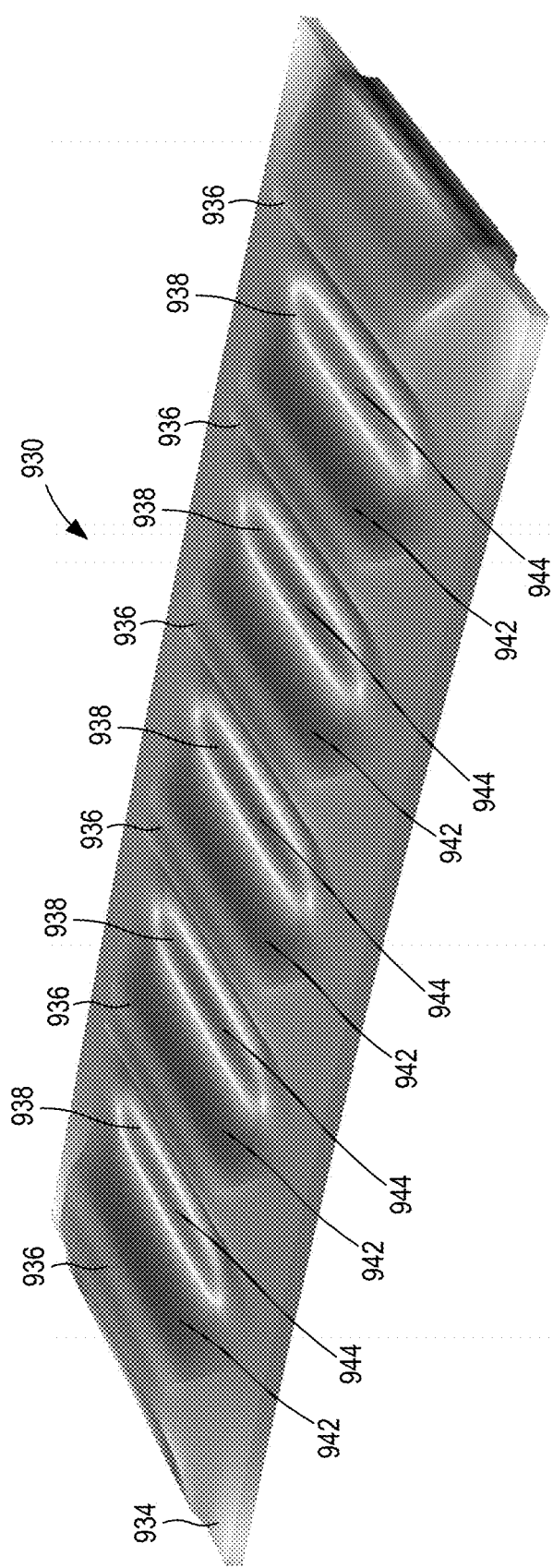
FIG. 10 is a bottom perspective view of a portion of a machine element, according to an embodiment.

As described in detail above with reference to specific embodiments, one or more dimensions of a backing member can be modified to selectively reduce the reluctance of one or more regions of the backing member. In some embodiments, by selectively increasing one or more dimensions of the backing member and thus, selectively increasing a flux-carrying capacity of select regions of the backing member, a magnetic flux density through, for example, substantially the entire width of the backing member can be substantially equalized and/or balanced. For example, FIG. 10 illustrates a bottom surface of a backing member 930 (opposite the surface to which the magnets are coupled) including a set of alternating first portions 936 and second portions 938 according to an embodiment. The backing member 930 can be arranged in a substantially similar manner to any of the backing members 130, 330, 430, 530, 630, and/or 730 described in detail above. As described above with reference to FIG. 9, the backing member 930 is shown as including regions of lighter shading 944 and darker shading 942 corresponding to relatively lower or relatively higher levels of magnetic saturation. When compared to the backing members 830 and 830' in FIG. 9, the backing member 930 has a more uniform magnetic flux distribution across the width of the backing member 930. For example, the difference in color intensity between the lighter shaded regions 944, associated with a lower magnetic flux between a corresponding set of magnetic pole pairs, and the darker shaded regions 942, associated with the higher magnetic flux through a center region of a corresponding magnetic pole pair shown in FIG. 10, is less than the difference in color intensity between the lighter shaded regions 844 and 844' and the darker shaded regions 842 and 842' of the backing members 830 and 830' of FIG. 9. Thus, as shown, the arrangement of the set of alternating first portions 936 and second portions 938 can be such that a level of saturation along the width of the backing member 930 is substantially equalized and/or balanced. In some instances, the magnetic flux density associated with a flow of magnetic flux through the backing member 930 can be similarly equalized and/or balanced.

FIGS. 11-25 illustrate examples of a portion of machine elements according to various embodiments. As described herein, the machine elements can be disposed in a machine structure such as, for example, an axial flux, radial flux, conical gap, transverse flux, or translational linear electromagnetic machines. In some embodiments, the machine elements can be a rotor element configured to rotate relative to a stator assembly (e.g., rotates with the direction of flux from rotor to stator generally in the axial or radial direction) or can move linearly relative to the stator assembly. In some embodiments, the machine element can form, for example, substantially the entire machine structure such as, for example, a substantially annular, non-segmented, and symmetric rotor or stator. In other embodiments, the machine element can be, for example, a machine element included in a segmented machine structure such as, for example, a segmented rotor or a segmented stator. In some embodiments, the machine element can be a rotor element that is disposed on substantially one side of a stator assembly, where a stator assembly can provide its own flux return, such as commonly practiced iron-core machines. In other embodiments, the machine element can be a rotor element of a two-sided rotor assembly, where rotor elements are disposed on either side of a stator assembly, such as the embodiment described in FIG. 4.

Figure 11:
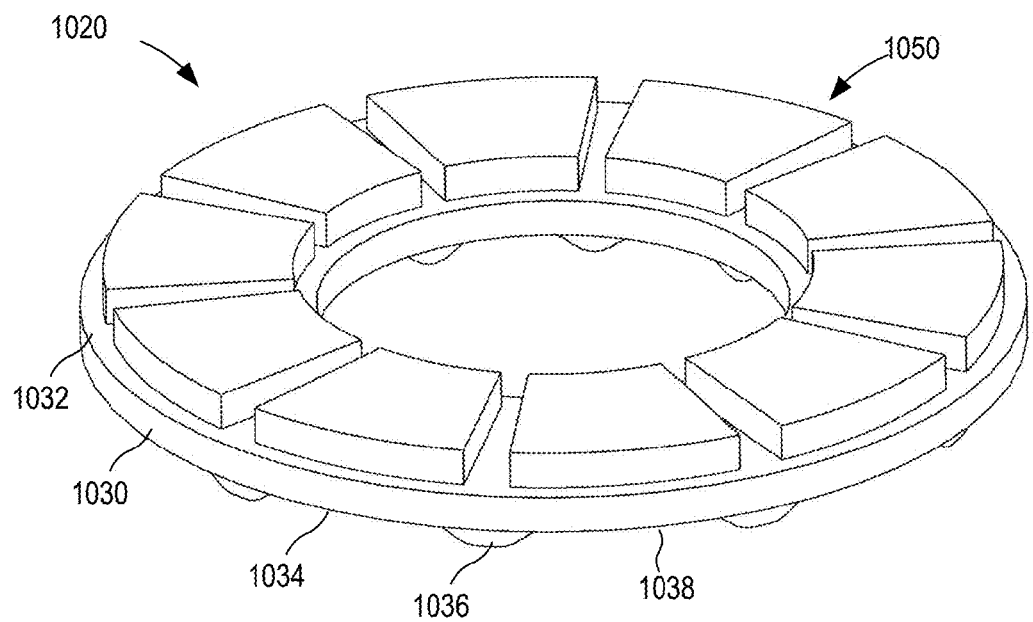
FIGS. 11-14 are perspective views of a portion of machine elements for an axial flux electromagnetic machine each according to a different embodiment.

For example, FIG. 11 illustrates a machine element 1020 of an axial flux machine according to an embodiment. In some embodiments, the machine element 1020 can be a rotor element or the like configured to rotate relative to a stator, as described above with reference to the machine structure 300 in FIG. 4. The machine element 1020 can include a backing member 1030 and a set of magnetic poles 1050. The backing member 1030 can have, for example, a substantially continuous, annular arrangement and can include a first surface 1032 and a second surface 1034, opposite the first surface 1032. As shown, the set of magnetic poles 1050 are coupled to the first surface 1032 of the backing member 1030, either directly or indirectly via an intervening structure (as described above with reference to the machine element 120). The magnetic poles 1050 can be substantially similar to any of those described herein, and can be arranged along the backing member 1030 such that a uniform distance is defined between each adjacent pair of the magnetic poles 1050, as described in detail above. More particularly, as described above, the magnetic poles 1050 can be arranged along a circumferential width of the backing member 1030. As such, the machine element 1020 can form, for example, a substantially annular and symmetric rotor element or stator element.

The second surface 1034 of the backing member 1030 includes a set of alternating first portions 1036 and second portions 1038. The arrangement of the set of alternating first portions 1036 and second portions 1038 can be, for example, substantially similar to the arrangement of the set of alternating first portions 436 and second portions 438 described above with reference to the machine element 420 of FIG. 5. As such, the first portions 1036 of the backing member 1030 can be associated with a first thickness (e.g., in an axial direction) and the second portions 1038 can be associated with a second thickness, less than the first thickness. The substantially continuous and/or symmetric arrangement of the machine element 1020 can be such that the first portions 1036 and the second portions 1038 are symmetrically arranged in the circumferential (e.g., widthwise) direction of the backing member 1030 and extend substantially the entire length of the backing member 1030 (e.g., in a radial direction). Moreover, the first portions 1036 can be substantially aligned with, for example, a space defined between the magnetic poles 1050, which are generally associated with a greater magnetic flux density, as described in detail above. In this manner the first portions 1036 and the second portions 1038 can be arranged relative to the magnetic poles 1050 such that substantially the entire backing member 1030 can carry and/or can support a desired magnetic flux, in a similar manner as described above with reference to, for example, the machine segment 420.

Figure 12:
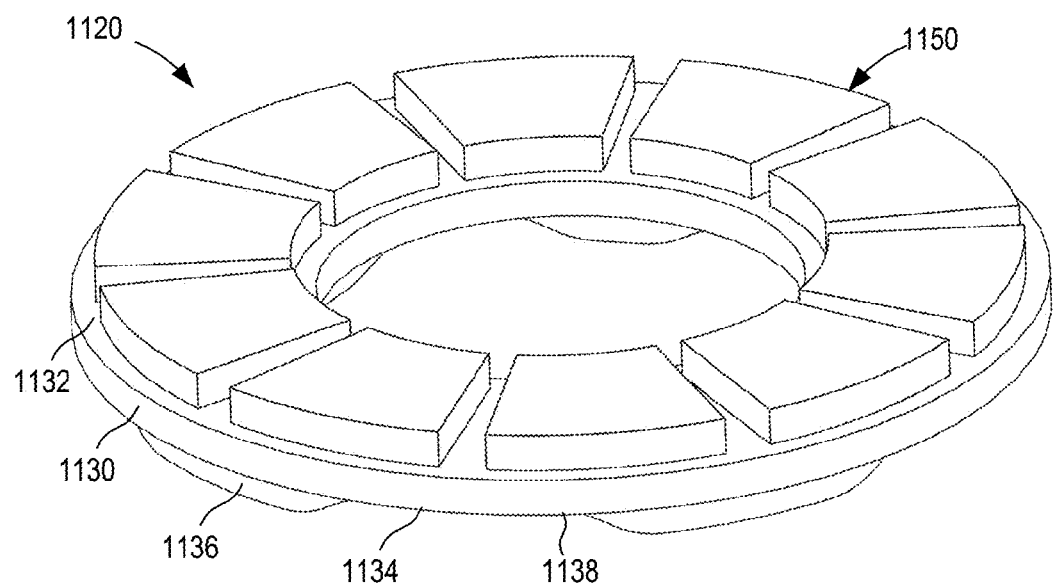

FIG. 12 illustrates a machine element 1120 of an axial flux machine according to another embodiment. The machine element 1120 includes a backing member 1130 and a set of magnetic poles 1150. The backing member 1130 can have, for example, a substantially continuous, annular arrangement and can include a first surface 1132 and a second surface 1134, opposite the first surface 1132. As shown, the set of magnetic poles 1150 are coupled to the first surface 1132 of the backing member 1130, either directly or indirectly via an intervening structure (as described above with reference to the machine element 120). The magnetic poles 1150 can be substantially similar to any of those described herein, and can be arranged along a width (e.g., in the circumferential direction) of the backing member 1130 such that a uniform distance is defined between each adjacent pair of the magnetic poles 1150, as described in detail above. Moreover, the magnetic poles 1150 can be arranged into, for example, magnetic pole pairs, as described in detail above with reference to the machine elements 520 and/or 620.

The second surface 1134 of the backing member 1130 includes a set of alternating first portions 1136 and second portions 1138. The arrangement of the set of alternating first portions 1136 and second portions 1138 can be, for example, substantially similar to the arrangement of the set of alternating first portions 536 and second portions 538 described above with reference to the machine element 520 of FIG. 6. As such, the first portions 1136 of the backing member 1130 can be associated with a first thickness and the second portions 1138 can be associated with a second thickness, less than the first thickness. The substantially continuous and/or symmetric arrangement of the machine element 1130 can be such that the first portions 1136 and the second portions 1138 are symmetrically arranged in the circumferential (e.g., widthwise) direction of the backing member 1130 and extend substantially the entire length of the backing member 1130 (e.g., in a radial direction). Moreover, the first portions 1136 can be substantially aligned with, for example, a space defined between the magnetic poles 1150 of a magnetic pole pair, which are generally associated with a greater magnetic flux. Similarly, the second portions 1138 can be substantially aligned with, for example, a space defined between adjacent magnetic pole pairs, as described above. In this manner the first portions 1136 and the second portions 1138 can be arranged relative to the magnetic poles 1150 such that substantially the entire backing member 1130 can carry and/or can support a desired magnetic flux, in a similar manner as described above with reference to, for example, the machine segment 520 in FIG. 6.

Figure 13:
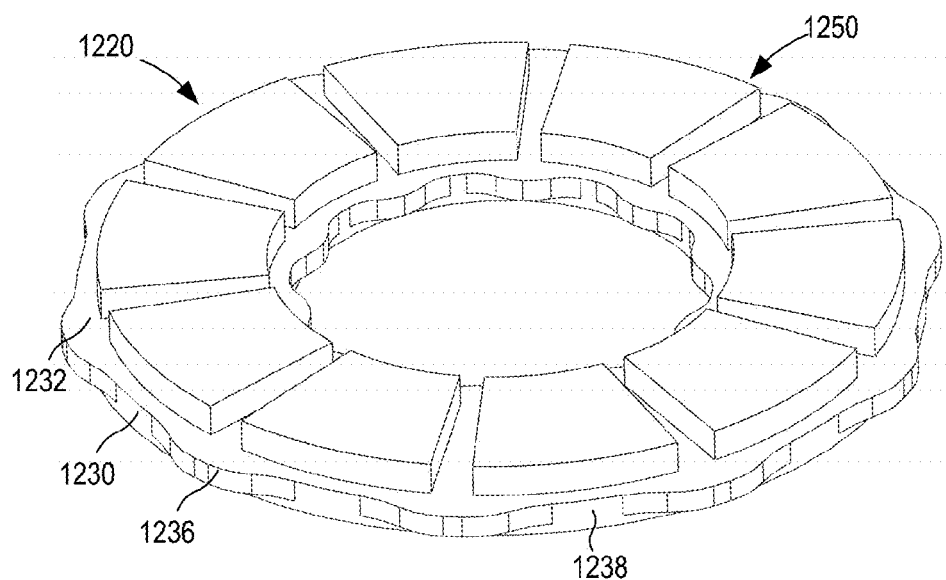

While the machine elements 1020 and 1120 are shown and described above as having a varied thickness (e.g., in the axial direction), in other embodiments, a machine element can be configured to have a length (e.g., in a radial direction) that is varied in a widthwise, tangential, and/or circumferential direction. For example, FIG. 13 illustrates a machine segment 1220 of an axial flux machine according to an embodiment. The machine element 1220 includes a backing member 1230 and a set of magnetic poles 1250. The backing member 1230 can have, for example, a substantially continuous, annular arrangement and can include a surface 1232 coupled to the set of magnetic poles 1250, as described above with reference to the machine element 120. The magnetic poles 1250 can be substantially similar to any of those described herein, and can be arranged along a width (e.g., in the circumferential direction) of the backing member 1230 such that a uniform distance is defined between each adjacent pair of the magnetic poles 1250, as described in detail above.

The backing member 1230 includes a set of alternating first portions 1236 and second portions 1238 that can be arranged in a substantially similar manner as described above with reference to the backing member 730 of FIG. 8. As such, the first portions 1236 of the backing member 1230 can be associated with a first length and the second portions 1238 can be associated with a second length, less than the first length. The substantially continuous and/or symmetric arrangement of the machine element 1230 can be such that the first portions 1236 and the second portions 1238 are symmetrically arranged in the circumferential (e.g., widthwise) direction of the backing member 1230. Moreover, the first portions 1236 can be substantially aligned with, for example, a space defined between the magnetic poles 1250, which are generally associated with a greater magnetic flux, as described in detail above. In this manner the first portions 1236 and the second portions 1238 can be arranged relative to the magnetic poles 1250 such that substantially the entire backing member 1230 can carry and/or can support a desired magnetic flux, in a similar manner as described above with reference to, for example, the machine segment 720 in FIG. 8.

Figure 14:
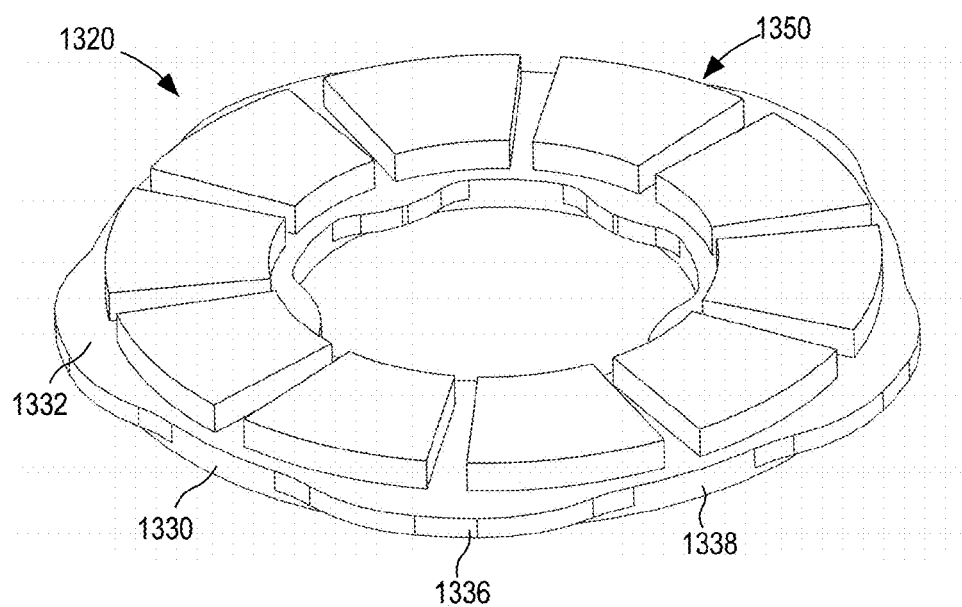

FIG. 14 illustrates a machine element 1320 of an axial flux machine according to another embodiment. The machine element 1320 includes a set of magnetic poles 1350 coupled to a surface 1332 of a backing member 1330. The backing member 1330 includes a set of alternating first portions 1336 and second portions 1338 that are arranged along a widthwise and/or circumferential direction of the backing member 1330. Moreover, the first portions 1336 can be associated with a first length of the backing member 1330 and the second portions 1338 can be associated with a second length of the backing member 1330, less than the first length. The machine element 1320 can be substantially similar to the machine element 1220 described above with reference to FIG. 13. The machine element 1320 can differ from the machine element 1220, however, in that the magnetic poles 1350 are arranged in, for example, magnetic pole pairs. As such, the first portions 1336 can be substantially aligned with, for example, a space defined between the magnetic poles 1350 of a magnetic pole pair, which are generally associated with a greater magnetic flux. Similarly, the second portions 1338 can be substantially aligned with, for example, a space defined between adjacent magnetic pole pairs, as described above. In this manner the first portions 1336 and the second portions 1338 can be arranged relative to the magnetic poles 1350 such that substantially the entire backing member 1330 can carry and/or can support a desired magnetic flux, in a similar manner as described above with reference to, for example, the machine segment 520 in FIG. 6.

Figure 15:
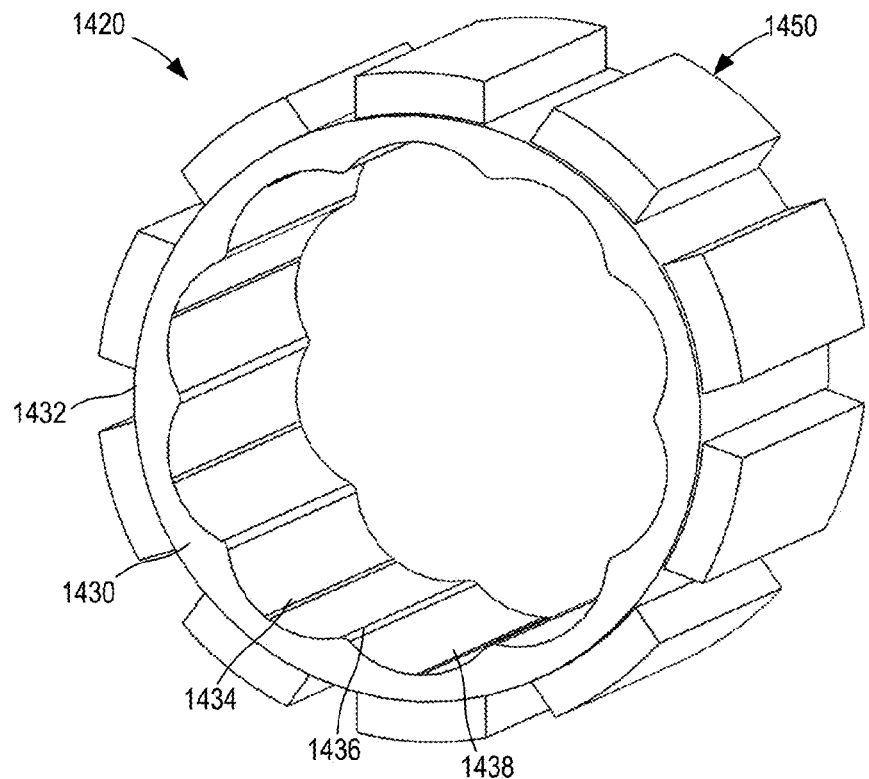
FIGS. 15-22 are perspective views of a portion of machine elements for a radial flux electromagnetic machine each according to a different embodiment.

While the machine elements 1020, 1120, 1220, and 1320 are described above as being included in a axial flux machine, in other embodiments, a machine element can be included in, for example, a radial flux machine. For example, FIG. 15 illustrates a machine element 1420 of a radial flux machine according to an embodiment. In some embodiments, the machine element 1420 can be, for example, a rotor element or the like that is configured to rotate relative to a stator. In such embodiments, the stator can be disposed around the outer circumference of the machine element 1420. As described above, the machine element 1420 includes a backing member 1430 and a set of magnetic poles 1450. The backing member 1430 can have, for example, a substantially continuous, annular arrangement and can include a first surface 1432 and a second surface 1434, opposite the first surface 1432. As shown, the set of magnetic poles 1450 are coupled to the first surface 1432 of the backing member 1430, either directly or indirectly via an intervening structure (as described above with reference to the machine element 120). The magnetic poles 1450 can be substantially similar to any of those described herein, and can be arranged along the backing member 1430 such that a uniform distance is defined between each adjacent pair of the magnetic poles 1450, as described in detail above. More particularly, as described above, the magnetic poles 1450 can be arranged along a circumferential width of the backing member 1430. As such, the machine element 1420 can form, for example, a substantially annular and symmetric rotor element. While first surface 1032 of the backing member 1030 is shown in FIG. 11 as being, for example, a planar surface and/or otherwise perpendicular to an axis of rotation, the first surface 1432 of the backing member 1430 is, for example, a cylindrical surface. In this manner, the magnetic poles 1450 can be distributed around the first surface 1432 in the circumferential or widthwise direction relative to the backing member 1430 and each magnetic pole 1450 can extend in an axial or lengthwise direction relative to the backing member 1430. Thus, the machine element 1420 can be included in, for example, a radial flux machine.

The second surface of the backing member 1430 includes a set of alternating first portions 1436 and second portions 1438 that are arranged along a widthwise and/or circumferential direction of the backing member 1430. As such, the first portions 1436 of the backing member 1430 can be associated with a first thickness (e.g., in a radial direction) and the second portions 1438 can be associated with a second thickness, less than the first thickness. The substantially continuous and/or symmetric arrangement of the machine element 1420 can be such that the first portions 1436 and the second portions 1438 are symmetrically arranged in the circumferential (e.g., widthwise) direction of the backing member 1430 and extend substantially the entire length of the backing member 1430 (e.g., in an axial direction). Moreover, the first portions 1436 can be substantially aligned with, for example, a space defined between the magnetic poles 1450, which are generally associated with a greater magnetic flux, as described in detail above. In this manner the first portions 1436 and the second portions 1438 can be arranged relative to the magnetic poles 1450 such that substantially the entire backing member 1430 can carry and/or can support a desired magnetic flux, in a similar manner as described above with reference to, for example, the machine segment 420.

Figure 16:
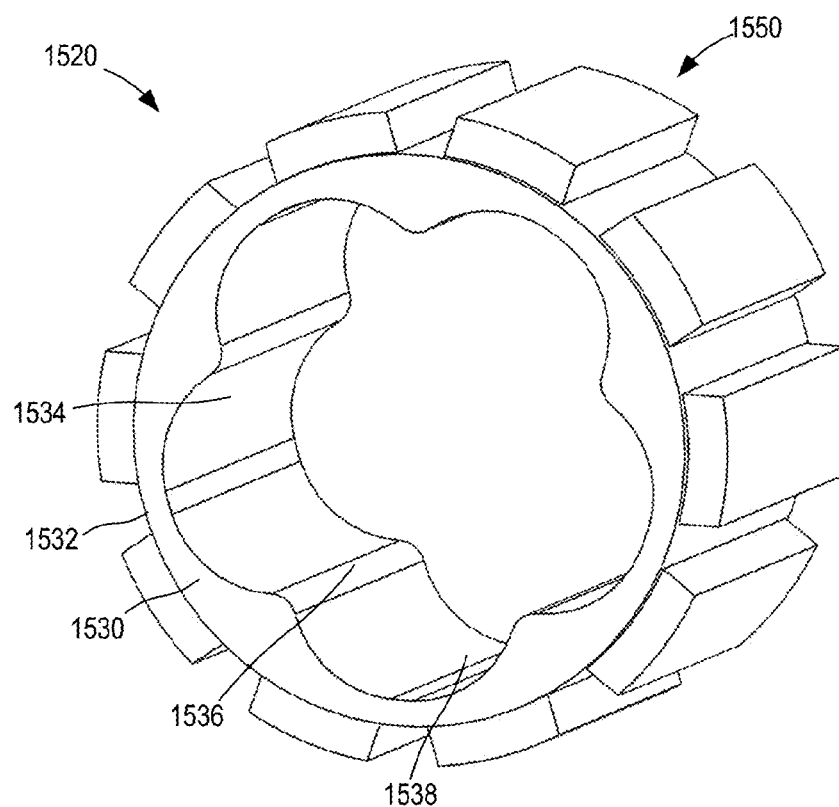

FIG. 16 illustrates a machine element 1520 of a radial flux machine according to another embodiment. In some embodiments, the machine element 1520 can be, for example, a rotor element or the like that is configured to rotate relative to a stator. In such embodiments, the stator can be disposed around the outer circumference of the machine element 1520. The machine element 1520 includes a backing member 1530 and a set of magnetic poles 1550. The backing member 1530 can have, for example, a substantially continuous, annular arrangement and can include a first surface 1532 and a second surface 1534, opposite the first surface 1532. As shown, the set of magnetic poles 1550 are coupled to the first surface 1532 of the backing member 1530, in a similar arrangement as described above with reference the machine element 1420 of FIG. 15. The machine element 1520 can differ from the machine element 1420; however, in that the magnetic poles 1550 are arranged in, for example, magnetic pole pairs, as described in further detail herein.

The second surface 1534 of the backing member 1530 includes a set of alternating first portions 1536 and second portions 1538 that can be, for example, substantially similar to the arrangement of the set of alternating first portions 1436 and second portions 1438 described above with reference to the machine element 1420 of FIG. 15. As such, the first portions 1536 of the backing member 1530 can be associated with a first thickness (e.g., in a radial direction) and the second portions 1538 can be associated with a second thickness, less than the first thickness. The arrangement of the first portions 1536 and the second portions 1538 can differ from the arrangement of the first portions 1436 and 1438, however, due at least in part to the magnetic poles 1550 being arranged in magnetic pole pairs. As such, the first portions 1536 can be substantially aligned with, for example, a space defined between the magnetic poles 1550 of a magnetic pole pair, which are generally associated with a greater magnetic flux, and the second portions 1538 can be substantially aligned with, for example, a space defined between adjacent magnetic pole pairs, as described above. In this manner the first portions 1536 and the second portions 1538 can be arranged relative to the magnetic poles 1550 such that substantially the entire backing member 1530 can carry and/or can support a desired magnetic flux, in a similar manner as described above with reference to, for example, the machine segment 520 in FIG. 6.

Figure 17:
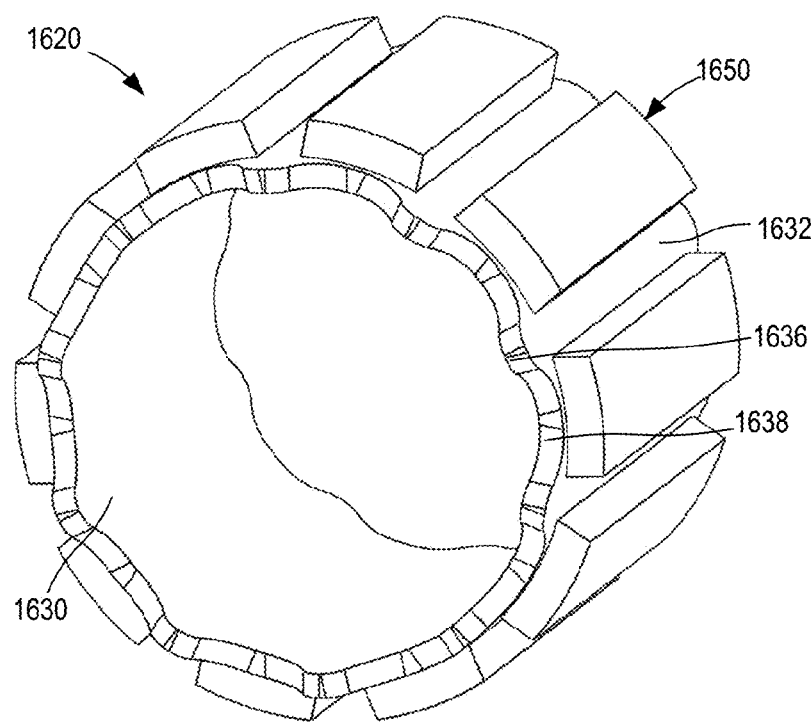

While the machine elements 1420 and 1520 are shown and described above as having a varied thickness (e.g., in the radial direction), in other embodiments, a machine element can be configured to have a length (e.g., in an axial direction) that is varied in a widthwise, tangential, and/or circumferential direction. For example, FIG. 17 illustrates a machine segment 1620 of a radial flux machine according to an embodiment. In some embodiments, the machine element 1620 can be, for example, a rotor element or the like that is configured to rotate relative to a stator. In such embodiments, the stator can be disposed around the outer circumference of the machine element 1620. The machine element 1620 includes a backing member 1630 and a set of magnetic poles 1650. The backing member 1630 can have, for example, a substantially continuous, annular arrangement and can include a surface 1632 (e.g., an outer surface) coupled to the set of magnetic poles 1650, in a similar arrangement as described above with reference the machine element 1420 of FIG. 15.

The backing member 1630 includes a set of alternating first portions 1636 and second portions 1638 that can be arranged in a substantially similar manner as described above with reference to the backing member 730 of FIG. 8. As such, the first portions 1636 of the backing member 1630 can be associated with a first length (e.g., in the axial direction) and the second portions 1638 can be associated with a second length, less than the first length. The substantially continuous and/or symmetric arrangement of the machine element 1620 can be such that the first portions 1636 and the second portions 1638 are symmetrically arranged in the circumferential (e.g., widthwise) direction of the backing member 1630. Moreover, the first portions 1636 can be substantially aligned with, for example, a space defined between the magnetic poles 1650, which are generally associated with a greater magnetic flux, as described in detail above. In this manner the first portions 1636 and the second portions 1638 can be arranged relative to the magnetic poles 1650 such that substantially the entire backing member 1630 can carry and/or can support a desired magnetic flux, in a similar manner as described above with reference to, for example, the machine segment 720 in FIG. 8.

Figure 18:
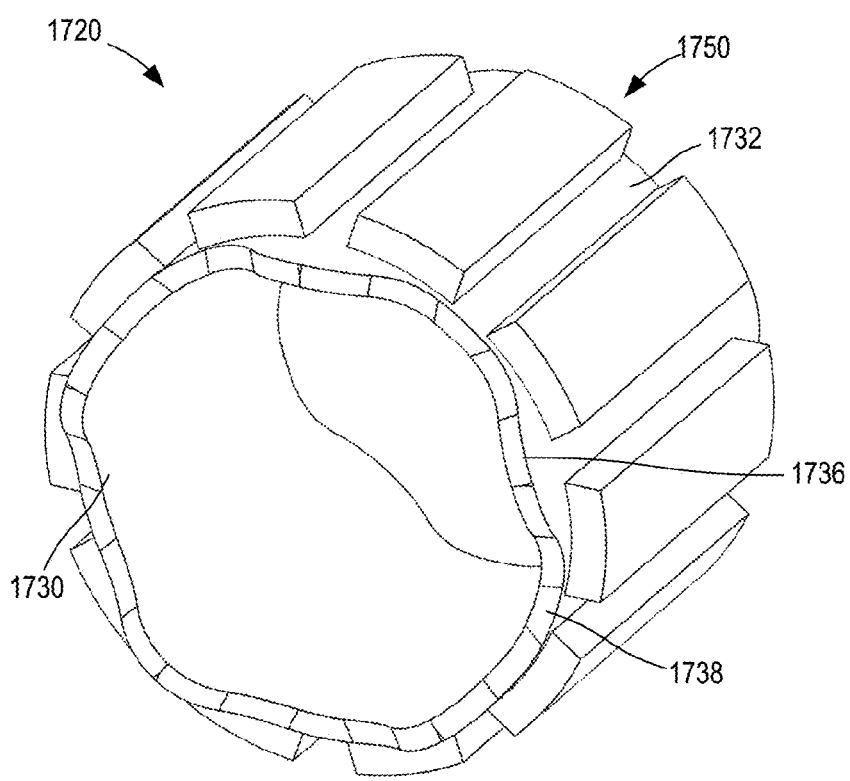

FIG. 18 illustrates a machine element 1720 of a radial flux machine according to another embodiment. The machine element 1720 includes a set of magnetic poles 1750 coupled to a surface 1732 of a backing member 1730. The backing member 1730 includes a set of alternating first portions 1736 and second portions 1738 that are arranged along a widthwise and/or circumferential direction of the backing member 1730. Moreover, the first portions 1736 can be associated with a first length of the backing member 1730 and the second portions 1738 can be associated with a second length of the backing member 1730, less than the first length. The machine element 1720 can be substantially similar to the machine element 1620 described above with reference to FIG. 17. The machine element 1720 can differ from the machine element 1620, however, in that the magnetic poles 1750 are arranged in, for example, magnetic pole pairs. As such, the first portions 1736 can be substantially aligned with, for example, a space defined between the magnetic poles 1750 of a magnetic pole pair, which are generally associated with a greater magnetic flux. Similarly, the second portions 1738 can be substantially aligned with, for example, a space defined between adjacent magnetic pole pairs, as described above. In this manner the first portions 1736 and the second portions 1738 can be arranged relative to the magnetic poles 1750 such that substantially the entire backing member 1730 can carry and/or can support a desired magnetic flux, in a similar manner as described above with reference to, for example, the machine segment 520 in FIG. 6.

Figure 19:
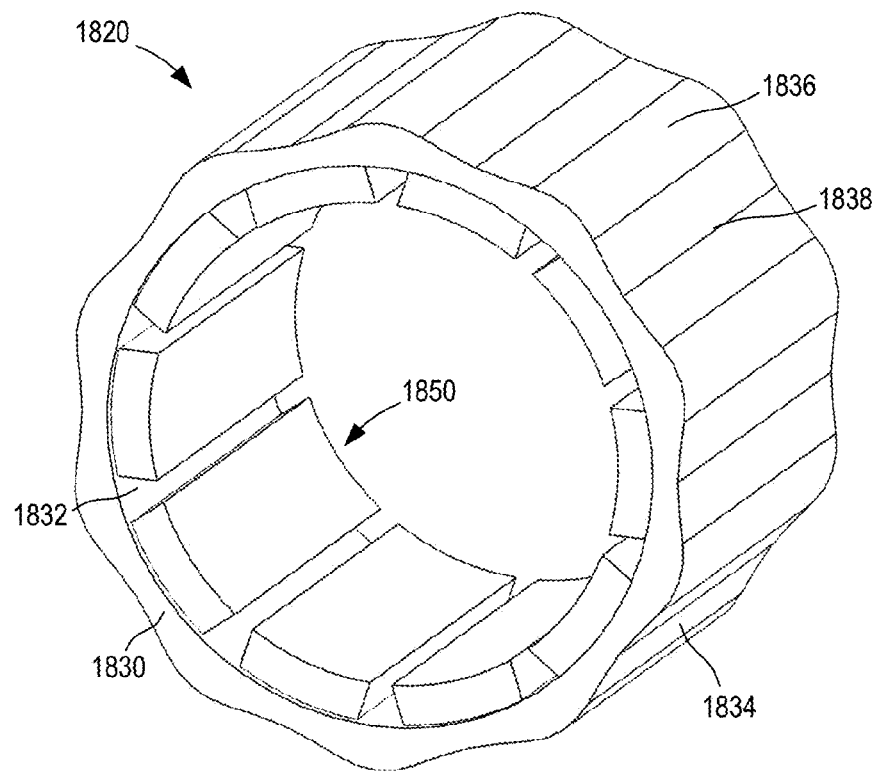

While the backing members 1430, 1530, 1630, and 1730 are shown and described as including the first surface 1432, 1532, 1632, and 1732, respectively, which forms an outer circumferential surface, in other embodiments, a machine element configured to be disposed in a radial flux machine can be arranged such that a set of magnetic poles are disposed on an inner surface of a backing member. For example, FIG. 19 illustrates a machine element 1820 of a radial flux machine according to another embodiment. In some embodiments, the machine element 1820 can be, for example, a rotor element or the like that is configured to rotate relative to a stator. In such embodiments, the machine element 1820 can be disposed around an outer circumference of the stator. The machine element 1820 includes a backing member 1830 and a set of magnetic poles 1850. The backing member 1830 can have, for example, a substantially continuous, annular arrangement and can include a first surface 1832 and a second surface 1834, opposite the first surface 1832. As shown, the set of magnetic poles 1850 are coupled to the first surface 1832 of the backing member 1830, in a similar arrangement as described above with reference to the machine element 1420 of FIG. 15. The machine element 1820 can differ from the machine element 1420, however, in that the first surface 1832 of the backing member 1830 is an inner surface thereof. The second surface 1834 of the backing member 1830 includes a set of alternating first portions 1836 and second portions 1838 that can be, for example, substantially similar to the arrangement of the set of alternating first portions 1436 and second portions 1438 described above with reference to the machine element 1420 of FIG. 15 yet, as shown in FIG. 19, the first portions 1836 and the second portions 1838 form, for example, an outer surface (e.g., the second surface 1834) of the backing member 1830. In this manner, the first portions 1836 and the second portions 1838 can be arranged relative to the magnetic poles 1850 such that substantially the entire backing member 1830 can carry and/or can support a desired magnetic flux, in a similar manner as described above with reference to, for example, the machine segment 420 in FIG. 5.

Figure 20:
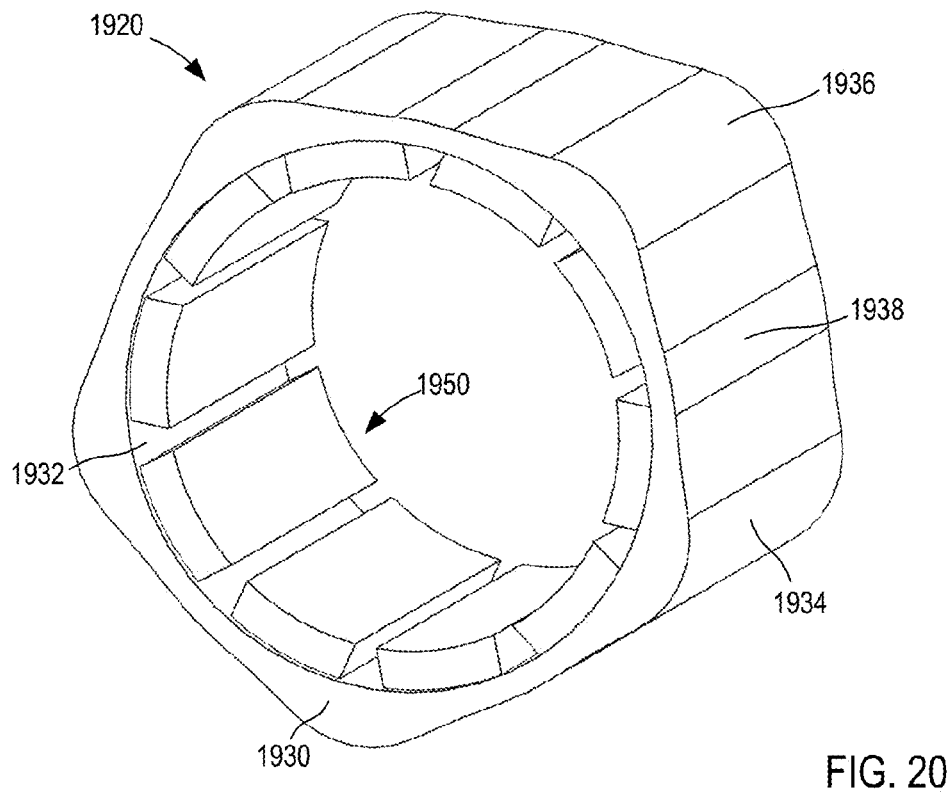

FIG. 20 illustrates a machine element 1920 of a radial flux machine according to another embodiment. The machine element 1920 includes a backing member 1930 and a set of magnetic poles 1950. In some embodiments, the machine element 1920 can be substantially similar in form and/or function as the machine element 1820 described above with reference to FIG. 19. As such, the backing member 1930 can have a substantially annular shape with a first surface 1932 (e.g., an inner surface) and a second surface 1934 (e.g., an outer surface). As shown, the set of magnetic poles 1950 are coupled to the first surface 1932 of the backing member 1930, in a similar arrangement as described above with reference the machine element 1820 of FIG. 19. The machine element 1920 can differ from the machine element 1820; however, in that the magnetic poles 1950 are arranged in, for example, magnetic pole pairs, as described in further detail herein.

The second surface 1934 of the backing member 1930 includes a set of alternating first portions 1936 and second portions 1938 that can be, for example, substantially similar to the arrangement of the set of alternating first portions 1636 and second portions 1838 described above with reference to the machine element 1820 of FIG. 19. As such, the first portions 1936 of the backing member 1930 can be associated with a first thickness (e.g., in a radial direction) and the second portions 1938 can be associated with a second thickness, less than the first thickness. The arrangement of the first portions 1936 and the second portions 1938 can differ from the arrangement of the first portions 1836 and 1838, however, due at least in part to the magnetic poles 1950 being arranged in magnetic pole pairs. As such, the first portions 1936 can be substantially aligned with, for example, a space defined between the magnetic poles 1950 of a magnetic pole pair, which are generally associated with a greater magnetic flux, and the second portions 1938 can be substantially aligned with, for example, a space defined between adjacent magnetic pole pairs, as described above. In this manner the first portions 1936 and the second portions 1938 can be arranged relative to the magnetic poles 1950 such that substantially the entire backing member 1930 can carry and/or can support a desired magnetic flux, in a similar manner as described above with reference to, for example, the machine segment 520 in FIG. 6.

Figure 21:
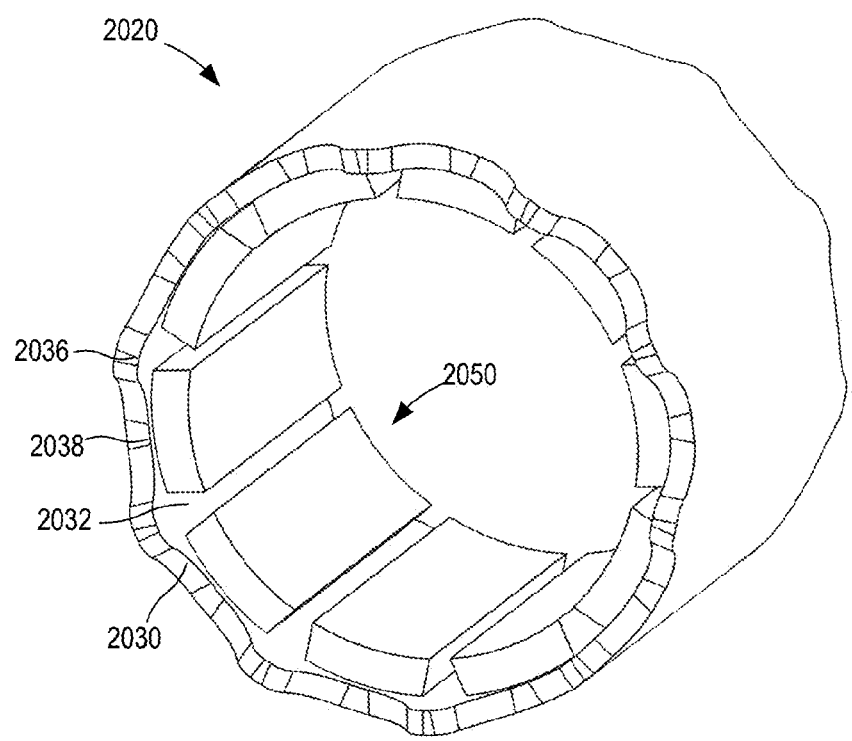

While the machine elements 1820 and 1920 are shown and described above as having a varied thickness (e.g., in the radial direction), in other embodiments, a machine element can be configured to have a length (e.g., in an axial direction) that is varied in a widthwise, tangential, and/or circumferential direction. For example, FIG. 21 illustrates a machine segment 2020 of a radial flux machine according to an embodiment. In some embodiments, the machine element 2020 can be, for example, a rotor element or the like that is configured to rotate relative to a stator. In such embodiments, the stator can be disposed around the inner circumference of the machine element 2020. The machine element 2020 includes a backing member 2030 and a set of magnetic poles 2050. The backing member 2030 can have, for example, a substantially continuous, annular arrangement and can include a surface 2032 (e.g., an inner surface) coupled to the set of magnetic poles 2050, in a similar arrangement as described above with reference the machine element 1820 of FIG. 19.

The backing member 2030 includes a set of alternating first portions 2036 and second portions 2038 that can be arranged in a substantially similar manner as described above with reference to the backing member 730 of FIG. 8. As such, the first portions 2036 of the backing member 2030 can be associated with a first length (e.g., in the axial direction) and the second portions 2038 can be associated with a second length, less than the first length. The substantially continuous and/or symmetric arrangement of the machine element 2020 can be such that the first portions 2036 and the second portions 2038 are symmetrically arranged in the circumferential (e.g., widthwise) direction of the backing member 2030. Moreover, the first portions 2036 can be substantially aligned with, for example, a space defined between the magnetic poles 2050, which are generally associated with a greater magnetic flux, as described in detail above. In this manner, the first portions 2036 and the second portions 2038 can be arranged relative to the magnetic poles 2050 such that substantially the entire backing member 2030 can carry and/or can support a desired magnetic flux, in a similar manner as described above with reference to, for example, the machine segment 720 in FIG. 8.

Figure 22:
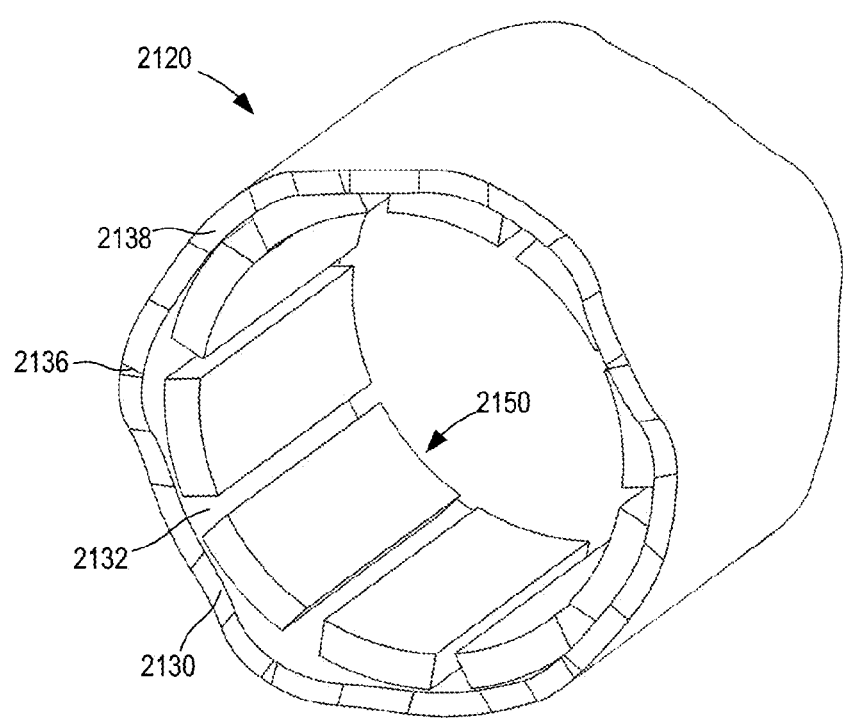

FIG. 22 illustrates a machine element 2120 of a radial flux machine according to another embodiment. The machine element 2120 includes a set of magnetic poles 2150 coupled to a surface 2132 of a backing member 2130. The backing member 2130 includes a set of alternating first portions 2136 and second portions 2138 that are arranged along a widthwise and/or circumferential direction of the backing member 2130. Moreover, the first portions 2136 can be associated with a first length of the backing member 2130 and the second portions 2138 can be associated with a second length of the backing member 2130, less than the first length. The machine element 2120 can be substantially similar to the machine element 2020 described above with reference to FIG. 21. The machine element 2120 can differ from the machine element 2020, however, in that the magnetic poles 2150 are arranged in, for example, magnetic pole pairs. As such, the first portions 2136 can be substantially aligned with, for example, a space defined between the magnetic poles 2150 of a magnetic pole pair, which is generally associated with a greater magnetic flux. Similarly, the second portions 2138 can be substantially aligned with, for example, a space defined between adjacent magnetic pole pairs, as described above. In this manner the first portions 2136 and the second portions 2138 can be arranged relative to the magnetic poles 2150 such that substantially the entire backing member 2130 can carry and/or can support a desired magnetic flux, in a similar manner as described above with reference to, for example, the machine segment 520 in FIG. 6.

Figure 23:
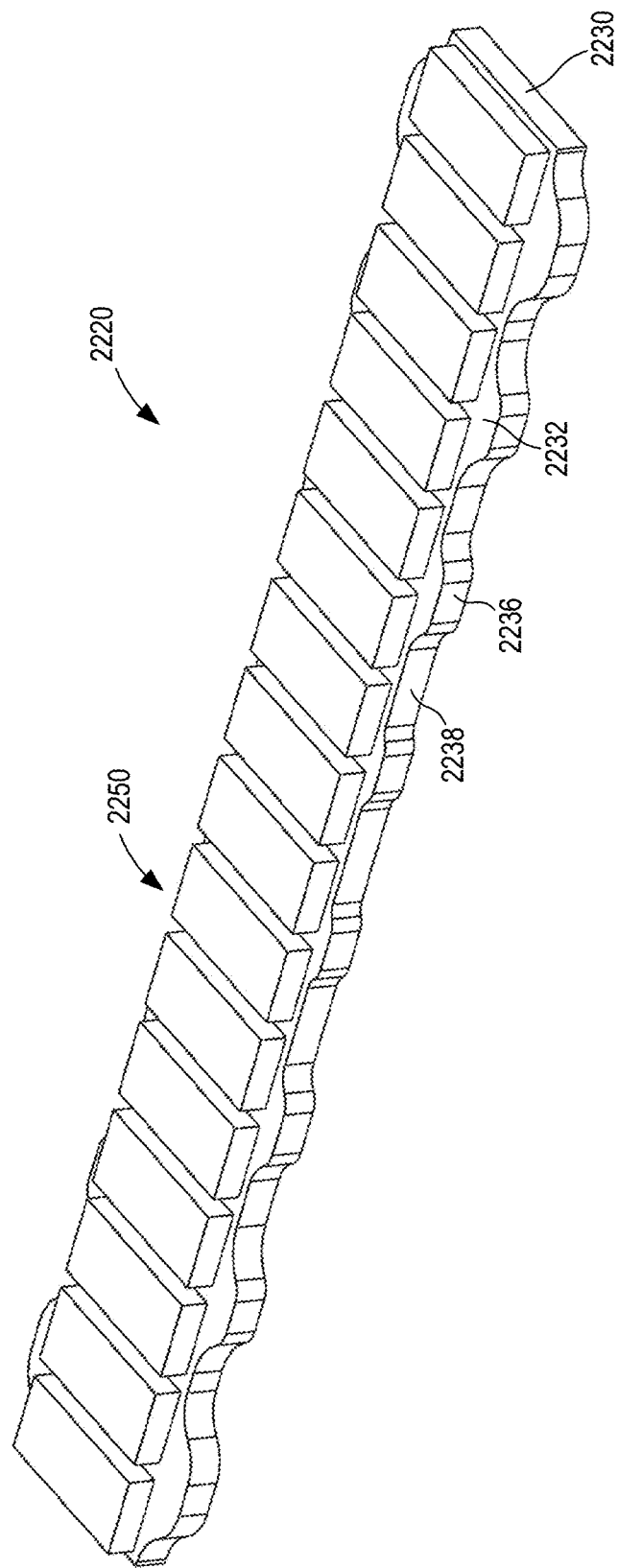
FIGS. 23 and 24 are perspective views of a portion of machine elements for a linear flux electromagnetic machine or a segmented rotational electromagnetic machine each according to a different embodiment.

Although the machine elements 1020, 1120, 1220, 1320, 1420, 1520, 1620, 1720, 1820, 1920, 2020, and 2120 were shown and described as forming a substantially continuous annular machine structure such as a rotor or stator, in other embodiments, a machine segment can be included in, for example, a segmented machine structure such as a segmented rotor or a segmented stator. For example, FIG. 23 illustrates a machine element 2220 according to an embodiment. The machine element 2220 can be disposed in a machine such as, for example, an axial flux, radial flux, conical gap, transverse flux, or translational linear electromagnetic machines. In some embodiments, the machine element 2220 can be a rotor element configured to rotate relative to a stator assembly (e.g., rotates with the direction of flux from rotor to stator generally in the axial or radial direction) or can move linearly relative to the stator assembly, as described in detail above.

The machine element 2220 includes a set of magnetic poles 2250 coupled to a surface 2232 of a backing member 2230. The set of magnetic poles 2250 can be substantially similar to any of those described herein. Moreover, the set of magnetic poles 2250 can be arranged in, for example, magnetic pole pairs, as described in detail above. The backing member 2230 also includes a set of alternating first portions 2236 and second portions 2238. The first portions 2236 can substantially aligned with, for example, a space defined between the magnetic poles 2250 of a magnetic pole pair, which are generally associated with a greater magnetic flux. Similarly, the second portions 2238 can be substantially aligned with, for example, a space defined between adjacent magnetic pole pairs, as described above, for example, with reference to the machine element 1320 of FIG. 14. With the machine element 2220 forming a segment of a machine structure, the arrangement of the first portions 2236 and the second portion 2238 can differ from the arrangement of the first portions 1336 and 1338 of the machine element 1320, however, in that a length associated with the first portions 2236 is varied. In other words, as shown in FIG. 23, a length of a first portion 2236 disposed closest to an end portion of the back iron 2230 is greater than a first portion 2236 disposed near a center region or midpoint of the back iron 2230 as described in more detail below. For example, in some embodiments, the arrangement of the first portions 2236 and the second portion 2238 can be substantially similar to the arrangement of the first portions 636 and the second portions 638 of the machine element 620 in FIG. 7.

With the machine element 2220 forming, for example, a segment of a machine structure (e.g., a rotor segment of a segmented rotor), a magnetic flux density can vary along a width of the backing member 2230. For example, as described above with reference to the machine element 620, a majority of the magnetic flux associated with each magnetic pole 2250 in one of the magnetic pole pairs can flow between the magnetic poles 2250 of that magnetic pole pair, while a smaller portion of the magnetic flux associated with the magnetic poles 2250 of that magnetic pole pair can flow to, for example, a magnetic pole 2250 of an adjacent magnetic pole pair. The magnetic flux associated with this magnetic pole pairing can be greatest at an end portion of the machine element 2220, and thus, the first portions 2236 that are located nearer to the end portion of the machine element 2220 can be larger than the first portions 2236 that are located nearer to the center of a machine element 2220. Accordingly, because the flux associated with the magnetic pole pairing in the center of a machine element 2220 is less than at the end portions of the machine element 2220, the first portions 2236 and the second portions 2238 in the center of the machine element 2220 may be relatively closer in size than at end portions of a machine element 2220. In this manner, the first portions 2236 and the second portions 2238 of the backing member 2230 can have a flux carrying capacity sufficient to support the magnetic flux associated with a flow of magnetic flux between the magnetic poles 2250 of the magnetic pole pairs and a flow of magnetic flux between adjacent magnetic pole pairs, for example, without approaching and/or reaching magnetic saturation, as described in detail above with reference to the machine element 620 in FIG. 7.

Figure 24:
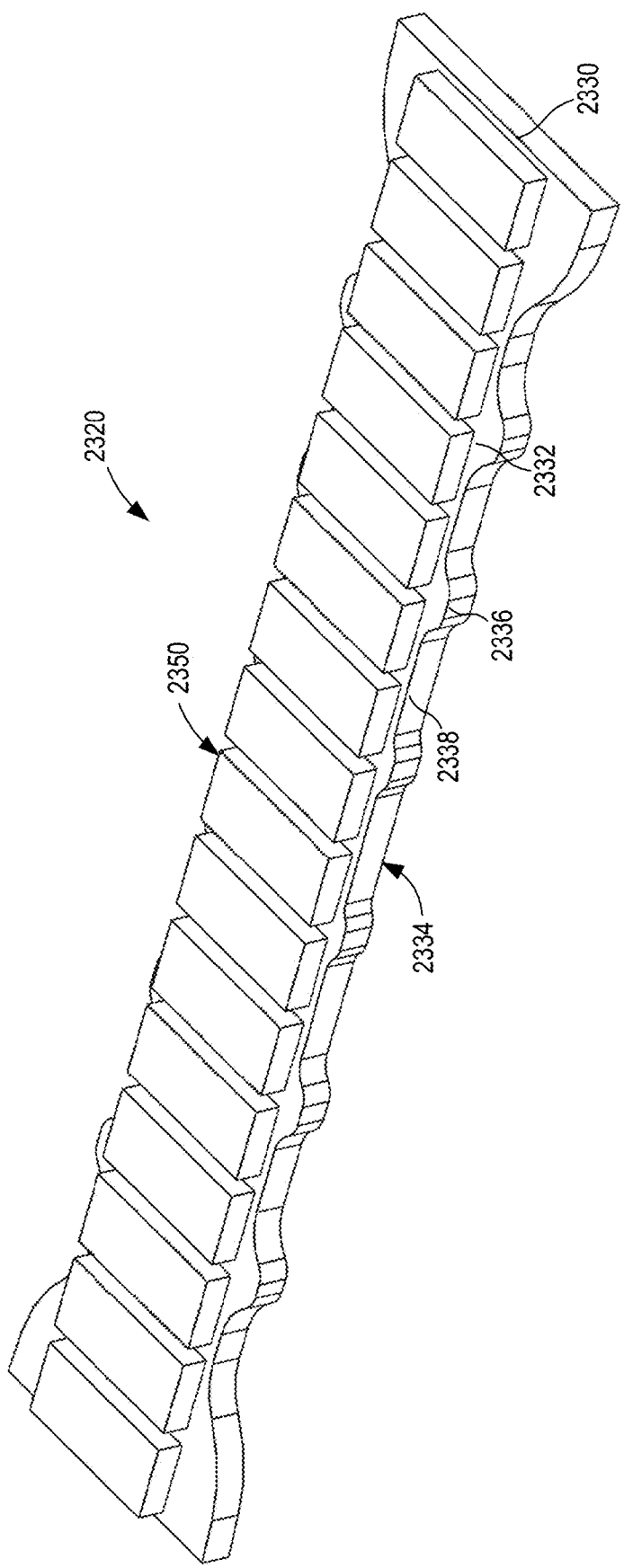
Figure 25:
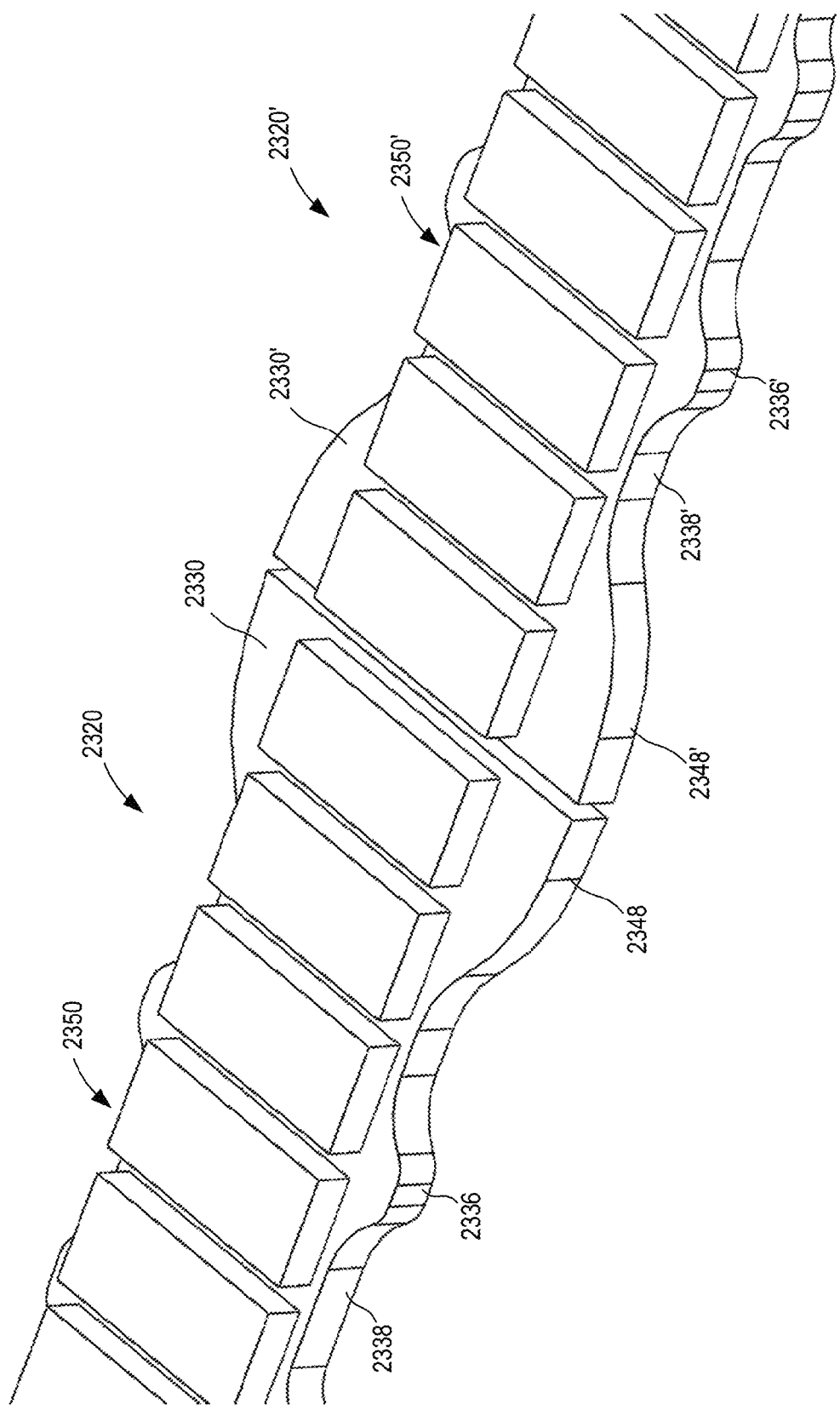
FIG. 25 is a perspective view of the machine element of FIG. 23 disposed adjacent to another machine element to form a portion of a machine assembly.

Although not shown in FIG. 23, in some embodiments, a machine element that forms, for example, an element of a segmented machine structure can include a backing member that can have an end portion with a length substantially greater than a length associated with any first portions and/or second portions thereof. For example, FIGS. 24 and 25 illustrate a first machine element 2320 (FIGS. 24 and 25) and a second machine element 2320' (FIG. 25). The first machine element 2320 and the second machine element 2320' can each be substantially similar to the machine element 2220 described above with reference to FIG. 23. As such, the first machine element 2320 can include a set of magnetic poles 2350, arranged in magnetic pole pairs, which are coupled to a surface 2332 of a backing member 2330. The backing member 2330 includes a set of alternating first portions 2336 and second portions 2338. The first portions 2336 can be substantially aligned with, for example, a space defined between the magnetic poles 2350 of a magnetic pole pair, which are generally associated with a greater magnetic flux. Similarly, the second portions 2338 can be substantially aligned with, for example, a space defined between adjacent magnetic pole pairs, as described above, for example, with reference to the machine element 1320 of FIG. 14. Moreover, a length associated with the first portions 2336 and/or a length associated with the second portions 2338 can be varied along a width of the backing member 2330, as described above with reference to the machine element 2220 in FIG. 23. Similarly, the second machine element 2320' can include a set of magnetic poles 2350', arranged in magnetic pole pairs, that are coupled to a surface 2332' of a backing member 2330'. The backing member 2330' of the second machine element 2320 includes a set of alternating first portions 2336' and second portions 2338'. The arrangement of the backing member 2330' and the set of magnetic poles 2350' of the second machine element 2320' can be substantially similar to the arrangement of the backing member 2330 and the second of magnetic poles 2350, respectively, of the first machine element 2320, and thus, is not described in further detail herein.

While first machine element 2320 is described as being substantially similar to the machine element 2220 of FIG. 23, the first machine element 2320 can differ from the machine element 2220, however, in the arrangement of an end portion 2348 of the backing member 2330. For example, as shown in FIGS. 24 and 25, the end portion 2348 of the backing member 2330 can have a length that is greater than a length of any of the first portions 2336 and/or the second portions 2338. Similarly, an end portion 2348' of the backing member 2330' included in the second machine element 2320' can have a length that is greater than a length of any of the first portions 2336' and/or second portions 2338'. Thus, when the first machine element 2320 and the second machine element 2320' are coupled together and/or otherwise disposed adjacent to one another, a magnetic flux can flow between the end portions 2348 and 2348' of the backing members 2330 and 2330', respectively, with a desired magnetic flux inclusive of, for example, an air gap disposed therebetween, as described in detail above with reference to the machine elements 320 and 320' in FIG. 4 and/or the machine elements 620 and 620' in FIG. 7. In this manner, substantially the entire backing member 2330 of the first machine element 2320 and substantially the entire backing member 2330' of the second machine element 2320' can carry and/or can support a desired magnetic flux, in a similar manner as described above with reference to for example, the machine segments 320, 320', 620, and 620'.

While FIGS. 23-25 describe the selective reduction of reluctance in a machine element by means of varying a flux carrying portion in a length dimension as previously defined, it should be understood that similar improvements can be made by means of adjusting a thickness dimension, either in a machine element of substantially constant length, or in combination with the variation of a length dimension. Furthermore, although the machine elements are shown as a substantially straight section, the described improvements can be realized in other shapes as previously discussed in relation to other machine designs such as axial flux, radial flux, conical gap, and transverse flux machines.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above Where schematics and/or embodiments described above indicate certain components arranged in certain orientations or positions, the arrangement of components may be modified. While the embodiments have been particularly shown and described, it will be understood that various changes in form and details may be made. Any portion of the apparatus and/or methods described herein may be combined in any combination, except mutually exclusive combinations. The embodiments described herein can include various combinations and/or sub-combinations of the functions, components, and/or features of the different embodiments described.

In addition, it should be understood that the features, components and methods described herein can be implemented on a variety of different types of electromagnetic machines, such as, for example, axial flux, radial flux, conical gap, and linear machines that can support rotational and/or linear or translational movement of a rotor assembly relative to a stator assembly. Furthermore, the features, components, and methods described herein can be implemented in air core electromagnetic machines as well as iron core electromagnetic machines, including those which implement a single-sided rotor, a double-sided rotor, or any other suitable design where a backing member carries flux between adjacent magnetic poles.

What is claimed is:

1. An apparatus comprising:
    a rotor element configured to be disposed for movement relative to a stator, the rotor element including:
        a backing member formed at least in part of a ferromagnetic material and having a first surface and a second surface opposite the first surface,
        a first magnetic pole having a first polarity coupled to the backing member on the first surface, and
        a second magnetic pole having a second polarity opposite the first polarity coupled to the backing member on the first surface,
        the backing member having a length, a width and a thickness, the second magnetic pole being disposed relative to the first magnetic pole at a distance defined in a direction of the width of the backing member,
        the thickness of the backing member varying along the width of the backing member such that the backing member includes a plurality of alternating first portions and second portions, the first portions including protrusions extending from the second surface and being thicker than the second portions, and
        a third magnetic pole coupled to the backing member and disposed relative to the second magnetic pole at a distance defined in a direction of the width of the backing member and on an opposite side of the second magnetic pole from the first magnetic pole, the third magnetic pole having the first polarity,
    one of the first portions from the plurality of alternating first portions and second portions being disposed between the second magnetic pole and the third magnetic pole.

2. The apparatus of claim 1, wherein one of the first portions from the plurality of alternating first portions and second portions being disposed between the first magnetic pole and the second magnetic pole.

3. The apparatus of claim 1, wherein the plurality of alternating first portions and second portions each extend along the length of the backing member.

4. The apparatus of claim 1, wherein the length of the backing member varies along the width of the backing member.

5. The apparatus of claim 1, wherein the length of the backing member varies along the width of the backing member such that the backing member has a first length at a first location between the first magnetic pole and the second magnetic pole in the widthwise direction that is greater than a second length in a second location.

6. The apparatus of claim 1, wherein the rotor element is disposed for rotational movement relative to the stator, the axis of rotation of the rotational movement being approximately parallel to the thickness.

7. An apparatus comprising:
    a rotor element configured to be disposed for movement relative to a stator, the rotor element including:
        a backing member formed at least in part of a ferromagnetic material,
        a first magnetic pole having a first polarity coupled to the backing member, and
        a second magnetic pole having a second polarity opposite the first polarity coupled to the backing member,
        the backing member having a length, a width and a thickness, the second magnetic pole being disposed relative to the first magnetic pole at a distance defined in the direction of the width of the backing member, the length of the backing member varying along the width of the backing member, and
        a third magnetic pole coupled to the backing member and disposed relative to the second magnetic pole at a distance defined in a direction of the width of the backing member and on an opposite side of the second magnetic pole than the first magnetic pole, the third magnetic pole having the first polarity,
        the length of the backing member varying along the width of the backing member such that the backing member has a first length between the first magnetic pole and the second magnetic pole in the widthwise direction that is greater than a second length between the second magnetic pole and the third magnetic pole in the widthwise direction.

8. The apparatus of claim 7, wherein the thickness of the backing member varies along the width of the backing member such that the backing member includes a plurality of alternating first portions and second portions, the first portions being thicker than the second portions, one of the first portions being disposed between the first magnetic pole and the second magnetic pole.

9. The apparatus of claim 7, wherein the thickness of the backing member varies along the width of the backing member such that the backing member includes a plurality of alternating first portions and second portions, the first portions being thicker than the second portions, the first portions and the second portions each extending along the length of the backing member.

10. The apparatus of claim 7, wherein the length of the backing member varies along the width of the backing member such that the backing member has a first length at a first location between the first magnetic pole and the second magnetic pole in the widthwise direction that is greater than a second length in a second location.

11. The apparatus of claim 7, wherein the rotor element is disposed for rotational movement relative to the stator, the axis of rotation of the rotational movement being approximately parallel to the thickness.

12. An apparatus, comprising:
a rotor element configured to be disposed for movement relative to a stator, the rotor element including a backing member formed at least in part of a ferromagnetic material, a first magnetic pole having a first polarity coupled to the backing member, a second magnetic pole having a second polarity opposite the first polarity coupled to the backing member, a third magnetic pole having the first polarity coupled to the backing member, and a fourth magnetic pole having the second polarity coupled to the backing member,
the backing member having a length, a width and a thickness and an end portion in the width direction, the second magnetic pole disposed at a distance in the width direction from the first magnetic pole on an opposite side of the first magnetic pole than the end portion of the backing member, the third magnetic pole disposed at a distance in the width direction from the second magnetic pole on an opposite side of the second magnetic pole than the first magnetic pole and the fourth magnetic pole disposed at a distance in the width direction from the third magnetic pole on an opposite side of the third magnetic pole than the second magnetic pole,
the backing member having a first portion with a first thickness at a location between the third magnetic pole and the fourth magnetic pole, the backing member having a second portion having a second thickness at a location between the first magnetic pole and the second magnetic pole, the second thickness being greater than the first thickness.

13. The apparatus of claim 12, wherein the end portion of the backing member has a third thickness, the third thickness being less than the first thickness.

14. The apparatus of claim 12, wherein the end portion of the backing member has a third thickness, the third thickness being greater than the first thickness.

15. The apparatus of claim 12, wherein the rotor element is a first rotor element, the backing member is a first backing member, the apparatus further comprising:
a second rotor element disposed adjacent the first rotor element and configured to be disposed for movement relative to the stator, the second rotor element including a second backing member formed at least in part of a ferromagnetic material and a fifth magnetic pole having the second polarity coupled to the second backing member, the second backing member having an end portion in the width direction,
the first backing member being disposed adjacent the second backing member at a distance defined in the width direction such that the end portion of the first backing member is disposed at a distance in the width direction from the end portion of the second backing member and the fifth magnetic pole is disposed relative to the first magnetic pole at a distance defined in the width direction.

16. The apparatus of claim 15, wherein the second backing member has a length, a width and a thickness, the second rotor element includes a sixth magnetic pole having the first polarity coupled to the second backing member and disposed relative to the fifth magnetic pole at a distance defined in the width direction of the second backing member,
the second backing member having a first portion with a first thickness at a location between the fifth magnetic pole and the end portion of the first backing member, the second backing member having a second portion having a second thickness at a location between the fifth magnetic pole and the sixth magnetic pole, the second thickness being greater than the first thickness.

17. The apparatus of claim 15, wherein the second backing member has a length, a width and a thickness, the second rotor element includes a sixth magnetic pole having the first polarity coupled to the second backing member and disposed relative to the fifth magnetic pole at a distance defined in the width direction of the second backing member,
the second backing member having a first portion with a first thickness at a location between the fifth magnetic pole and the end portion of the second backing member, the second backing member having a second portion having a second thickness at a location between the fifth magnetic pole and the sixth magnetic pole, the second thickness being less than the first thickness.

18. The apparatus of claim 12, wherein the length of the backing member varies along the width of the backing member such that the backing member has a first length at a first location between the first magnetic pole and the second magnetic pole in the widthwise direction that is greater than a second length in a second location.

19. An apparatus, comprising:
a rotor element configured to be disposed for movement relative to a stator, the rotor element including a backing member formed at least in part of a ferromagnetic material, a first magnetic pole having a first polarity coupled to the backing member, a second magnetic pole having a second polarity opposite the first polarity coupled to the backing member, a third magnetic pole having the first polarity coupled to the backing member, and a fourth magnetic pole having the second polarity coupled to the backing member,
the backing member having a length, a width and a thickness and an end portion in the width direction, the second magnetic pole disposed at a distance in the width direction from the first magnetic pole on an opposite side of the first magnetic pole than the end portion of the backing member, the third magnetic pole disposed at a distance in the width direction from the second magnetic pole on an opposite side of the second magnetic pole than the first magnetic pole and the fourth magnetic pole disposed at a distance in the width direction from the third magnetic pole on an opposite side of the third magnetic pole than the second magnetic pole,
the backing member having a first portion with a first length at a location between the third magnetic pole and the fourth magnetic pole, the backing member having a second portion having a second length at a location between the first magnetic pole and the second magnetic pole, the second length being greater than the first length.

20. The apparatus of claim 19, wherein the end portion of the backing member has a third length, the third length being less than the first length.

21. The apparatus of claim 19, wherein the end portion of the backing member has a third length, the third length being greater than the first length.

22. The apparatus of claim 19, wherein the rotor element is a first rotor element, the backing member is a first backing member, the apparatus further comprising:
   a second rotor element disposed adjacent the first rotor element and configured to be disposed for movement relative to the stator, the second rotor element including a second backing member formed at least in part of a ferromagnetic material and a fifth magnetic pole having the second polarity coupled to the second backing member, the second backing member having an end portion in the width direction,
   the first backing member being disposed adjacent the second backing member at a distance defined in the width direction such that the end portion of the first backing member is disposed at a distance in the width direction from the end portion of the second backing member and the fifth magnetic pole is disposed relative to the first magnetic pole at a distance defined in the width direction.

23. The apparatus of claim 22, wherein the second backing member has a length, a width and a thickness, the second rotor element includes a sixth magnetic pole having the first polarity coupled to the second backing member and disposed relative to the fifth magnetic pole at a distance defined in the width direction of the second backing member,
   the second backing member having a first portion with a first length at a location between the fifth magnetic pole and the end portion of the first backing member, the second backing member having a second portion having a second length at a location between the fifth magnetic pole and the sixth magnetic pole, the second length being greater than the first length.

24. The apparatus of claim 22, wherein the second backing member has a length, a width and a thickness, the second rotor element includes a sixth magnetic pole having the first polarity coupled to the second backing member and disposed relative to the fifth magnetic pole at a distance defined in the width direction of the second backing member,
   the second backing member having a first portion with a first length at a location between the fifth magnetic pole and the end portion of the first backing member, the second backing member having a second portion having a second length at a location between the fifth magnetic pole and the sixth magnetic pole, the second length being less than the first length.

* * * * *